US012609919B2

(12) United States Patent
Jain et al.

(10) Patent No.: US 12,609,919 B2
(45) Date of Patent: Apr. 21, 2026

(54) INITIAL ACCESSORY SETUP

(71) Applicant: Apple Inc., Cupertino, CA (US)

(72) Inventors: Anshul Jain, San Diego, CA (US);
Craig M. Federighi, Los Altos Hills,
CA (US); Andreas I. Gal, Portola
Valley, CA (US); Jared S. Grubb,
Seattle, WA (US); Arun G. Mathias,
Los Altos, CA (US); **Anush G.
Nadathur, San Jose, CA (US); Philip
W. Schiller**, Half Moon Bay, CA (US);
Justin N. Wood, Los Altos, CA (US)

(73) Assignee: Apple Inc., Cupertino, CA (US)

( * ) Notice: Subject to any disclaimer, the term of this
patent is extended or adjusted under 35
U.S.C. 154(b) by 70 days.

(21) Appl. No.: 18/370,366

(22) Filed: Sep. 19, 2023

(65) Prior Publication Data

US 2024/0137352 A1     Apr. 25, 2024
US 2024/0236065 A9     Jul. 11, 2024

Related U.S. Application Data

(60) Provisional application No. 63/418,440, filed on Oct.
21, 2022.

(51) Int. Cl.
*H04L 9/40*        (2022.01)
(52) U.S. Cl.
CPC ............ *H04L 63/08* (2013.01); *H04L 63/105*
(2013.01)
(58) Field of Classification Search
CPC .............................. H04L 63/08; H04L 63/105
See application file for complete search history.

(56) References Cited

U.S. PATENT DOCUMENTS

| | | | |
|---|---|---|---|
| 8,554,956 | B1 | 10/2013 | Wieland |
| 9,811,393 | B2 | 11/2017 | Kiehtreiber et al. |
| 10,032,041 | B2 | 7/2018 | Martel et al. |
| 10,970,383 | B2 | 4/2021 | Boyd et al. |

(Continued)

FOREIGN PATENT DOCUMENTS

| | | |
|---|---|---|
| AU | 2015274582 B2 | 4/2020 |
| DE | 112016006827 T5 | 3/2019 |
| EP | 3301938 A1 | 4/2018 |
| KR | 2015-0036539 A | 4/2015 |

(Continued)

OTHER PUBLICATIONS

International Search Report and Written Opinion from PCT/US2023/
033307, dated Dec. 15, 2023, 13 pages.

(Continued)

*Primary Examiner* — Chau Le
(74) *Attorney, Agent, or Firm* — BAKERHOSTETLER;
Kyle B. Morse

(57) ABSTRACT

Some techniques are described herein for initially setting up
an accessory with a controller. Such techniques have a setup
component of a controller establish a relationship with the
accessory and facilitate establishment of relationships
between applications of the controller and the accessory. In
some examples, the setup component causes an accessory
management credential to be installed on the accessory so
that the accessory can be configured by the setup component
to establish a relationship with an application in communi-
cation with the setup component. In some examples, such
communication between the application and the accessory
occurs without further interactions with the setup compo-
nent.

24 Claims, 9 Drawing Sheets

(56)                References Cited

U.S. PATENT DOCUMENTS

| | | | |
|---|---|---|---|
| 2014/0019653 | A1 | 1/2014 | Amchislavsky et al. |
| 2014/0375439 | A1 | 12/2014 | Rezvani et al. |
| 2015/0222517 | A1* | 8/2015 | McLaughlin ......... H04L 63/061 |
| | | | 713/171 |
| 2016/0285311 | A1 | 9/2016 | Masumoto et al. |
| 2016/0360341 | A1 | 12/2016 | Srivatsa et al. |
| 2017/0091412 | A1* | 3/2017 | Johnson .................. H04W 4/80 |
| 2018/0063310 | A1 | 3/2018 | McGary et al. |
| 2018/0352435 | A1* | 12/2018 | Donley .............. H04W 12/062 |
| 2019/0213767 | A1 | 7/2019 | Verma |
| 2020/0151686 | A1 | 5/2020 | Komandur et al. |
| 2020/0219322 | A1 | 7/2020 | Verma et al. |
| 2020/0322668 | A1 | 10/2020 | Hawthorne |
| 2020/0412735 | A1* | 12/2020 | Suhail ..................... H04L 63/20 |
| 2021/0012445 | A1 | 1/2021 | Bartfai-Walcott et al. |
| 2021/0076204 | A1 | 3/2021 | Goyal et al. |
| 2022/0159048 | A1 | 5/2022 | Newton |
| 2022/0164940 | A1 | 5/2022 | Francis et al. |
| 2022/0229671 | A1* | 7/2022 | Nadathur .......... H04M 1/72409 |

FOREIGN PATENT DOCUMENTS

| | | |
|---|---|---|
| WO | WO 2019/072011 A1 | 4/2019 |
| WO | WO 2022/155609 A1 | 7/2022 |
| WO | WO 2022/258131 A1 | 12/2022 |

OTHER PUBLICATIONS

U.S. Appl. No. 18/370,369; Non-Final Office Action; dated May 21, 2025; 11 pages.

U.S. Appl. No. 18/370,371; Non-Final Office Action; dated May 8, 2025; 23 pages.

International Search Report and Written Opinion from PCT/US2023/033308, dated Dec. 19, 2023, 15 pages.

International Search Report and Written Opinion from PCT/US2023/033306, dated Dec. 7, 2023, 12 pages.

U.S. Appl. No. 18/370,371; Final Office Action; dated Sep. 23, 2025; 39 pages.

U.S. Appl. No. 18/370,369; Final Office Action; dated Sep. 24, 2025; 13 pages.

* cited by examiner

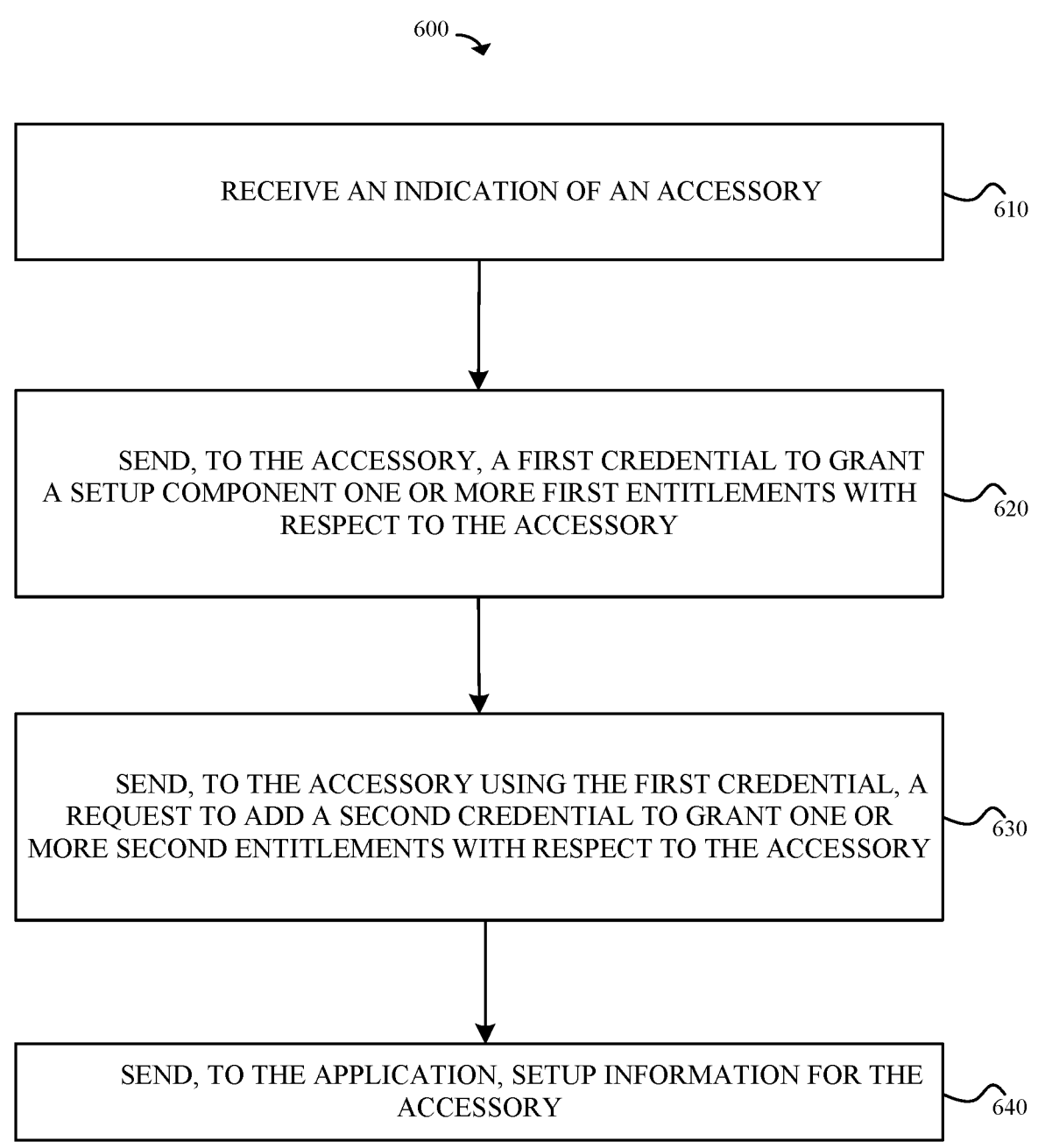

600

RECEIVE AN INDICATION OF AN ACCESSORY — 610

SEND, TO THE ACCESSORY, A FIRST CREDENTIAL TO GRANT A SETUP COMPONENT ONE OR MORE FIRST ENTITLEMENTS WITH RESPECT TO THE ACCESSORY — 620

SEND, TO THE ACCESSORY USING THE FIRST CREDENTIAL, A REQUEST TO ADD A SECOND CREDENTIAL TO GRANT ONE OR MORE SECOND ENTITLEMENTS WITH RESPECT TO THE ACCESSORY — 630

SEND, TO THE APPLICATION, SETUP INFORMATION FOR THE ACCESSORY — 640

SEND, TO A SETUP COMPONENT, A REQUEST TO ADD AN ACCESSORY TO A FIRST ECOSYSTEM 710

RECEIVE, FROM THE SETUP COMPONENT, SETUP INFORMATION FOR A FIRST ACCESSORY 720

SEND, TO THE FIRST ACCESSORY, A REQUEST TO ADD A CREDENTIAL TO GRANT THE APPLICATION ONE OR MORE FIRST ENTITLEMENTS WITH RESPECT TO THE FIRST ACCESSORY 730

800

| RECEIVE, FROM A SETUP COMPONENT OF A COMPUTER SYSTEM, A FIRST CREDENTIAL TO GRANT THE SETUP COMPONENT ONE OR MORE FIRST ENTITLEMENTS WITH RESPECT TO THE ACCESSORY | 810 |

| RECEIVE, FROM THE SETUP COMPONENT, A REQUEST TO ADD A SECOND CREDENTIAL TO GRANT ONE OR MORE SECOND ENTITLEMENTS WITH RESPECT TO THE ACCESSORY | 820 |

| RECEIVE, FROM AN APPLICATION OF THE COMPUTER SYSTEM, A REQUEST TO ADD THE SECOND CREDENTIAL TO GRANT THE APPLICATION THE ONE OR MORE SECOND ENTITLEMENTS WITH RESPECT TO THE ACCESSORY | 830 |

*FIG. 8*

INITIAL ACCESSORY SETUP

CROSS-REFERENCE, TO RELATED APPLICATIONS

The present application claims benefit of U.S. Provisional Application Ser. No. 63/418,440, entitled "INITIAL ACCESSORY SETUP" filed Oct. 21, 2022, which is hereby incorporated by reference in its entirety for all purposes.

BACKGROUND

Electronic devices are becoming increasingly interconnected. For example, controllers (e.g., user devices and or computer systems) are often connected to accessories (e.g., a speaker, a fan, and a thermostat) in the home or office. Setting up such electronic devices has become more difficult as the configurations of those connections have become more complicated. Accordingly, there is a need to improve techniques for setting up different electronic devices.

SUMMARY

Current techniques for setting up electronic devices (e.g., controllers, accessories, user devices, and/or computer systems) are generally ineffective and/or inefficient. For example, some techniques require users to manually enter codes into a user interface of one electronic device to set up a connection to another electronic device. For another example, different applications associated with one electronic device are individually set up to connect to another electronic device. This disclosure provides more effective and/or efficient techniques for setting up electronic devices using examples of applications of a controller connecting with accessories. It should be recognized that other types of electronic devices can be used with techniques described herein. For example, a smartphone can connect with a laptop using techniques described herein. In addition, techniques optionally complement or replace other techniques for connecting electronic devices.

Some techniques are described herein for initially setting up an accessory with a controller. Such techniques have a setup component of a controller establish a relationship with the accessory and facilitate establishment of relationships between applications of the controller and the accessory. In some examples, the setup component causes an accessory management credential to be installed on the accessory so that the accessory can be configured by the setup component to establish a relationship with an application in communication with the setup component. In some examples, such communication between the application and the accessory occurs without further interactions with the setup component.

A modification to the techniques described above includes using different communication protocols for communications with or from the setup component as compared to communications with or from the application. In some examples, this modification provides different levels of security and/or privacy based on the different communication protocols that are used.

Another modification to such techniques includes having the setup component act as a bridge for the application such that all or most communications from the application to the accessory occur through the setup component. In some examples, this other modification allows for an application to control the accessory, regardless of whether the application is configured to communicate using a communication protocol that is compatible with the accessory.

In some examples, a method is performed at a setup component of a computer system. In some examples, the method comprises: receiving an indication of an accessory, wherein the accessory is different from the computer system; in response to receiving the indication, sending, to the accessory, a first credential to grant the setup component one or more first entitlements with respect to the accessory; and after sending the first credential: sending, to the accessory using the first credential, a request to add a second credential to grant one or more second entitlements with respect to the accessory, wherein the second credential is different from the first credential; and sending, to an application of the computer system, setup information for the accessory, wherein the setup information is intended to be used by the application to communicate with the accessory to grant the application the one or more second entitlements with respect to the accessory, and wherein the application is different from the setup component.

In some examples, a non-transitory computer-readable storage medium storing one or more programs configured to be executed by one or more processors of a computer system is described. In some examples, the one or more programs includes instructions for: receiving an indication of an accessory, wherein the accessory is different from the computer system; in response to receiving the indication, sending, to the accessory, a first credential to grant a setup component of the computer system one or more first entitlements with respect to the accessory; and after sending the first credential: sending, to the accessory using the first credential, a request to add a second credential to grant one or more second entitlements with respect to the accessory, wherein the second credential is different from the first credential; and sending, to an application of the computer system, setup information for the accessory, wherein the setup information is intended to be used by the application to communicate with the accessory to grant the application the one or more second entitlements with respect to the accessory, and wherein the application is different from the setup component.

In some examples, a transitory computer-readable storage medium storing one or more programs configured to be executed by one or more processors of a computer system is described. In some examples, the one or more programs includes instructions for: receiving an indication of an accessory, wherein the accessory is different from the computer system; in response to receiving the indication, sending, to the accessory, a first credential to grant a setup component of the computer system one or more first entitlements with respect to the accessory; and after sending the first credential: sending, to the accessory using the first credential, a request, to add a second credential to grant one or more second entitlements with respect to the accessory, wherein the second credential is different from the first credential; and sending, to an application of the computer system, setup information for the accessory, wherein the setup information is intended to be used by the application to communicate with the accessory to grant the application the one or more second entitlements with respect to the accessory, and wherein the application is different from the setup component.

In some examples, a computer system is described. In some examples, the computer system comprises one or more processors and memory storing one or more program configured to be executed by the one or more processors. In some examples, the one or more programs includes instructions for: receiving an indication of an accessory, wherein the accessory is different from the computer system; in response to receiving the indication, sending, to the accessory, a first credential to grant a setup component of the computer system one or more first entitlements with respect to the accessory; and after sending the first credential: sending, to the accessory using the first credential, a request to add a second credential to grant one or more second entitlements with respect to the accessory, wherein the second credential is different from the first credential; and sending, to an application of the computer system, setup information for the accessory, wherein the setup information is intended to be used by the application to communicate with the accessory to grant the application the one or more second entitlements with respect to the accessory, and wherein the application is different from the setup component.

In some examples, a computer system is described. In some examples, the computer system comprises means for performing each of the following steps: receiving an indication of an accessory, wherein the accessory is different from the computer system; in response to receiving the indication, sending, to the accessory, a first credential to grant a setup component of the computer system one or more first entitlements with respect to the accessory; and after sending the first credential: sending, to the accessory using the first credential, a request to add a second credential to grant one or more second entitlements with respect to the accessory, wherein the second credential is different from the first credential; and sending, to an application of the computer system, setup information for the accessory, wherein the setup information is intended to be used by the application to communicate with the accessory to grant the application the one or more second entitlements with respect to the accessory, and wherein the application is different from the setup component.

In some examples, a computer program product is described. In some examples, the computer program product comprises one or more programs configured to be executed by one or more processors of a computer system. In some examples, the one or more programs include instructions for: receiving an indication of an accessory, wherein the accessory is different from the computer system; in response to receiving the indication, sending, to the accessory, a first credential to grant a setup component of the computer system one or more first entitlements with respect to the accessory; and after sending the first credential: sending, to the accessory using the first credential, a request to add a second credential to grant one or more second entitlements with respect to the accessory, wherein the second credential is different from the first credential, and sending, to an application of the computer system, setup information for the accessory, wherein the setup information is intended to be used by the application to communicate with the accessory to grant the application the one or more second entitlements with respect to the accessory, and wherein the application is different from the setup component.

In some examples, a method is performed at an application of a computer system. In some examples, the method comprises: sending, to a setup component of the computer system, a request to add an accessory to a first ecosystem, wherein the setup component is different from the application; after sending the request, receiving, from the setup component, setup information for a first accessory; and sending, to the first accessory, a request to add a credential to grant the application one or more first entitlements with respect to the first accessory, wherein the request to add the credential includes at least a portion of the setup information.

In some examples, a non-transitory computer-readable storage medium storing one or more programs configured to be executed by one or more processors of a computer system is described. In some examples, the one or more programs includes instructions for: sending, to a setup component of the computer system, a request to add an accessory to a first ecosystem, wherein the setup component is different from an application of the computer system; after sending the request, receiving, from the setup component, setup information for a first accessory; and sending, to the first accessory, a request to add a credential to grant the application one or more first entitlements with respect to the first accessory, wherein the request to add the credential includes at least a portion of the setup information.

In some examples, a transitory computer-readable storage medium storing one or more programs configured to be executed by one or more processors of a computer system is described. In some examples, the one or more programs includes instructions for: sending, to a setup component of the computer system, a request to add an accessory to a first ecosystem, wherein the setup component is different from an application of the computer system; after sending the request, receiving, from the setup component, setup information for a first accessory; and sending, to the first accessory, a request to add a credential to grant the application one or more first entitlements with respect to the first accessory, wherein the request to add the credential includes at least a portion of the setup information.

In some examples, a computer system is described. In some examples, the computer system comprises one or more processors and memory storing one or more program configured to be executed by the one or more processors. In some examples, the one or more programs includes instructions for: sending, to a setup component of the computer system, a request to add an accessory to a first ecosystem, wherein the setup component is different from an application of the computer system; after sending the request, receiving, from the setup component, setup information for a first accessory; and sending, to the first accessory, a request to add a credential to grant the application one or more first entitlements with respect to the first accessory, wherein the request to add the credential includes at least a portion of the setup information.

In some examples, a computer system is described. In some examples, the computer system comprises means for performing each of the following steps: sending, to a setup component of the computer system, a request to add an accessory to a first ecosystem, wherein the setup component is different from an application of the computer system; after sending the request, receiving, from the setup component, setup information for a first accessory; and sending, to the first accessory, a request to add a credential to grant the application one or more first entitlements with respect to the first accessory, wherein the request to add the credential includes at least a portion of the setup information.

In some examples, a computer program product is described. In some examples, the computer program product comprises one or more programs configured to be executed by one or more processors of a computer system. In some examples, the one or more programs include instructions for: sending, to a setup component of the computer system, a request to add an accessory to a first ecosystem, wherein the setup component is different from an application of the computer system; after sending the request, receiving, from the setup component, setup information for a first accessory; and sending, to the first accessory, a request to add a credential to grant the application one or more first entitlements with respect to the first accessory, wherein the request to add the credential includes at least a portion of the setup information.

In some examples, a method is performed at an accessory. In some examples, the method comprises: receiving, from a setup component of a computer system, a first credential to grant the setup component one or more first entitlements with respect to the accessory; after receiving the first credential, receiving, from the setup component, a request to add a second credential to grant one or more second entitlements with respect to the accessory, wherein the second credential is different from the first credential; and after receiving the request to add the second credential from the setup component, receiving, from an application of the computer system, a request to add the second credential to grant the application the one or more second entitlements with respect to the accessory, wherein the application is different from the setup component.

In some examples, a non-transitory computer-readable storage medium storing one or more programs configured to be executed by one or more processors of an accessory is described. In some examples, the one or more programs includes instructions for: receiving, from a setup component of a computer system, a first credential to grant the setup component one or more first entitlements with respect to the accessory; after receiving the first credential, receiving, from the setup component, a request to add a second credential to grant one or more second entitlements with respect to the accessory, wherein the second credential is different from the first credential; and after receiving the request to add the second credential from the setup component, receiving, from an application of the computer system, a request to add the second credential to grant the application the one or more second entitlements with respect to the accessory, wherein the application is different from the setup component.

In some examples, a transitory computer-readable storage medium storing one or more programs configured to be executed by one or more processors of an accessory is described. In some examples, the one or more programs includes instructions for: receiving, from a setup component of a computer system, a first credential to grant the setup component one or more first entitlements with respect to the accessory; after receiving the first credential, receiving, from the setup component, a request to add a second credential to grant one or more second entitlements with respect to the accessory, wherein the second credential is different from the first credential; and after receiving the request to add the second credential from the setup component, receiving, from an application of the computer system, a request to add the second credential to grant the application the one or more second entitlements with respect to the accessory, wherein the application is different from the setup component.

In some examples, an accessory is described. In some examples, the accessory comprises one or more processors and memory storing one or more program configured to be executed by the one or more processors. In some examples, the one or more programs includes instructions for: receiving, from a setup component of a computer system, a first credential to grant the setup component one or more first entitlements with respect to the accessory; after receiving the first credential, receiving, from the setup component, a request to add a second credential to grant one or more second entitlements with respect to the accessory, wherein the second credential is different from the first credential;

and after receiving the request to add the second credential from the setup component, receiving, from an application of the computer system, a request to add the second credential to grant the application the one or more second entitlements with respect to the accessory, wherein the application is different from the setup component.

In some examples, an accessory is described. In some examples; the accessory comprises means for performing each of the following steps: receiving, from a setup component of a computer system, a first credential to grant the setup component one or more first entitlements with respect to the accessory; after receiving the first credential, receiving, from the setup component, a request to add a second credential to grant one or more second entitlements with respect to the accessory, wherein the second credential is different from the first credential; and after receiving the request to add the second credential from the setup component, receiving, from an application of the computer system, a request to add the second credential to grant the application the one or more second entitlements with respect to the accessory, wherein the application is different from the setup component.

In some examples, a computer program product is described. In some examples, the computer program product comprises one or more programs configured to be executed by one or more processors of an accessory. In some examples, the one or more programs include instructions for: receiving, from a setup component of a computer system, a first credential to grant the setup component one or more first entitlements with respect to the accessory; after receiving the first credential, receiving, from the setup component; a request to add a second credential to grant one or more second entitlements with respect to the accessory, wherein the second credential is different from the first credential; and after receiving the request to add the second credential from the setup component, receiving, from an application of the computer system, a request to add the second credential to grant the application the one or more second entitlements with respect to the accessory, wherein the application is different from the setup component.

DESCRIPTION OF THE FIGURES

For a better understanding of the various described embodiments, reference should be made to the Detailed Description below, in conjunction with the following drawings in which like reference numerals refer to corresponding parts throughout the figures.

FIG. 6 is a flow diagram illustrating a method for initial setup of an accessory from the perspective of a setup component in accordance with some embodiments.

FIG. 8 is a flow diagram illustrating a method for initial setup of an accessory from the perspective of the accessory in accordance with some embodiments.

DETAILED DESCRIPTION

Figure 1:
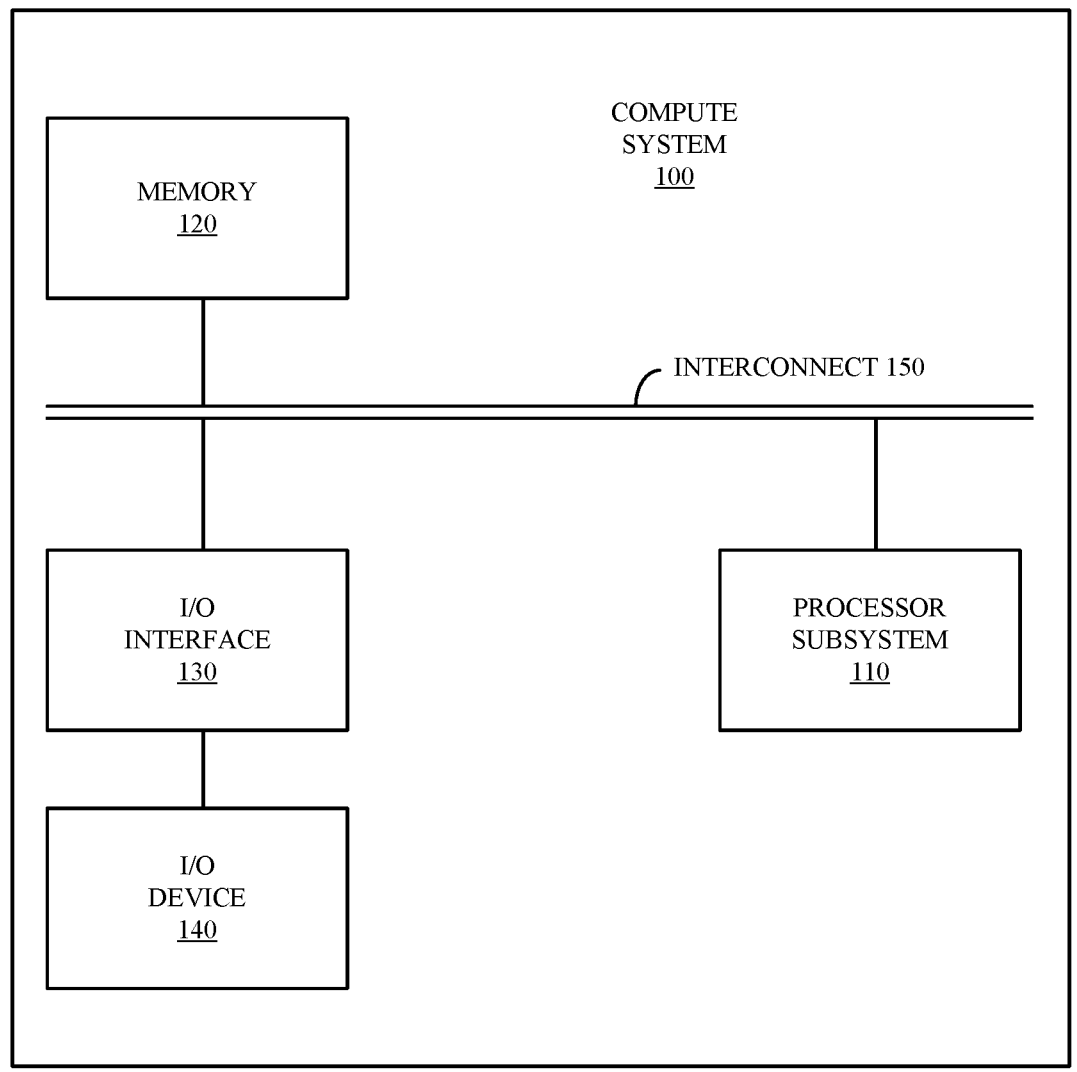
FIG. 1 is a block diagram illustrating a compute system.

The following description sets forth exemplary techniques, methods, parameters, systems, computer-readable storage mediums, and the like. It should be recognized, however, that such description is not intended as a limitation on the scope of the present disclosure. Instead, such description is provided as a description of exemplary embodiments.

Methods described herein can include one or more steps that are contingent upon one or more conditions being satisfied. It should be understood that a method can occur over multiple iterations of the same process with different steps of the method being satisfied in different iterations. For example, if a method requires performing a first step upon a determination that a set of one or more criteria is met and a second step upon a determination that the set of one or more criteria is not met, a person of ordinary skill in the art would appreciate that the steps of the method are repeated until both conditions, in no particular order, are satisfied. Thus, a method described with steps that are contingent upon a condition being satisfied can be rewritten as a method that is repeated until each of the conditions described in the method are satisfied. This, however, is not required of system or computer readable medium claims where the system or computer readable medium claims include instructions for performing one or more steps that are contingent upon one or more conditions being satisfied. Because the instructions for the system or computer readable medium claims are stored in one or more processors and/or at one or more memory locations, the system or computer readable medium claims include logic that can determine whether the one or more conditions have been satisfied without explicitly repeating steps of a method until all of the conditions upon which steps in the method are contingent have been satisfied. A person having ordinary skill in the art would also understand that, similar to a method with contingent steps, a system or computer readable storage medium can repeat the steps of a method as many times as needed to ensure that all of the contingent steps have been performed.

Although the following description uses terms "first," "second," etc. to describe various elements, these elements should not be limited by the terms. In some examples, these terms are used to distinguish one element from another. For example, a first subsystem could be termed a second subsystem, and, similarly, a subsystem device could be termed a subsystem device, without departing from the scope of the various described embodiments. In some examples, the first subsystem and the second subsystem are two separate references to the same subsystem. In some embodiments, the first subsystem and the second subsystem are both subsystem, but they are not the same subsystem or the same type of subsystem.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when," "upon," "in response to determining," "in response to detecting," or "in accordance with a determination that" depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," or "in accordance with a determination that [the stated condition or event]" depending on the context.

Turning to FIG. 1, a block diagram of compute system 100 is illustrated. Compute system 100 is a non-limiting example of a compute system that can be used to perform functionality described herein. It should be recognized that other computer architectures of a compute system can be used to perform functionality described herein.

In the illustrated example, compute system 100 includes processor subsystem 110 communicating with (e.g., wired or wirelessly) memory 120 (e.g., a system memory) and I/O interface 130 via interconnect 150 (e.g., a system bus, one or more memory locations, or other communication channel for connecting multiple components of compute system 100). In addition, I/O interface 130 is communicating with (e.g., wired or wirelessly) to I/O device 140. In some examples, I/O interface 130 is included with I/O device 140 such that the two are a single component. It should be recognized that there can be one or more I/O interfaces, with each I/O interface communicating with one or more I/O devices. In some examples, multiple instances of processor subsystem 110 can be communicating via interconnect 150.

Compute system 100 can be any of various types of devices, including, but not limited to, a system on a chip, a server system, a personal computer system (e.g., a smartphone, a smartwatch, a wearable device, a tablet, a laptop computer, and/or a desktop computer), a sensor, or the like. In some examples, compute system 100 is included or communicating with a physical component for the purpose of modifying the physical component in response to an instruction. In some examples, compute system 100 receives an instruction to modify a physical component and, in response to the instruction, causes the physical component to be modified. In some examples, the physical component is modified via an actuator, an electric signal, and/or algorithm. Examples of such physical components include an acceleration control, a break, a gear box, a hinge, a motor, a pump, a refrigeration system, a spring, a suspension system, a steering control, a pump, a vacuum system, and/or a valve. In some examples, a sensor includes one or more hardware components that detect information about a physical environment in proximity to (e.g., surrounding) the sensor. In some examples, a hardware component of a sensor includes a sensing component (e.g., an image sensor or temperature sensor), a transmitting component (e.g., a laser or radio transmitter), a receiving component (e.g., a laser or radio receiver), or any combination thereof. Examples of sensors include an angle sensor, a chemical sensor, a brake pressure sensor, a contact sensor, a non-contact sensor, an electrical sensor, a flow sensor, a force sensor, a gas sensor, a humidity sensor, an image sensor (e.g., a camera sensor, a radar sensor, and/or a LiDAR sensor), an inertial measurement unit, a leak sensor, a level sensor, a light detection and ranging system, a metal sensor, a motion sensor, a particle sensor, a photoelectric sensor, a position sensor (e.g., a global positioning system), a precipitation sensor, a pressure sensor, a proximity sensor, a radio detection and ranging system, a radiation sensor, a speed sensor (e.g., measures the speed of an object), a temperature sensor, a time-of-flight sensor, a torque sensor, and an ultrasonic sensor. In some examples, a sensor includes a combination of multiple sensors. In some examples, sensor data is captured by fusing data from one sensor with data from one or more other sensors. Although a single compute system is shown in FIG. 1, compute system 100 can also be implemented as two or more compute systems operating together.

In some examples, processor subsystem 110 includes one or more processors or processing units configured to execute program instructions to perform functionality described herein. For example, processor subsystem 110 can execute an operating system, a middleware system, one or more applications, or any combination thereof.

In some examples, the operating system manages resources of compute system 100. Examples of types of operating systems covered herein include batch operating systems (e.g., Multiple Virtual Storage (MVS)), time-sharing operating systems (e.g., Unix), distributed operating systems (e.g., Advanced Interactive eXecutive (AIX), network operating systems (e.g., Microsoft Windows Server), and real-time operating systems (e.g., QNX). In some examples, the operating system includes various procedures, sets of instructions, software components, and/or drivers for controlling and managing general system tasks (e.g., memory management, storage device control, power management, or the like) and for facilitating communication between various hardware and software components. In some examples, the operating system uses a priority-based scheduler that assigns a priority to different tasks that processor subsystem 110 can execute. In such examples, the priority assigned to a task is used to identify a next task to execute. In some examples, the priority-based scheduler identifies a next task to execute when a previous task finishes executing. In some examples, the highest priority task runs to completion unless another higher priority task is made ready.

In some examples, the middleware system provides one or more services and/or capabilities to applications (e.g., the one or more applications running on processor subsystem 110) outside of what the operating system offers (e.g., data management, application services, messaging, authentication, API management, or the like). In some examples, the middleware system is designed for a heterogeneous computer cluster to provide hardware abstraction, low-level device control, implementation of commonly used functionality, message-passing between processes, package management, or any combination thereof. Examples of middleware systems include Lightweight Communications and Marshalling (LCM), PX4. Robot Operating System (ROS), and ZeroMQ. In some examples, the middleware system represents processes and/or operations using a graph architecture, where processing takes place in nodes that can receive, post, and multiplex sensor data messages, control messages, state messages, planning messages, actuator messages, and other messages. In such examples, the graph architecture can define an application (e.g., an application executing on processor subsystem 110 as described above) such that different operations of the application are included with different nodes in the graph architecture.

In some examples, a message sent from a first node in a graph architecture to a second node in the graph architecture is performed using a publish-subscribe model, where the first node publishes data on a channel in which the second node can subscribe. In such examples, the first node can store data in memory (e.g., memory 120 or some local memory of processor subsystem 110) and notify the second node that the data has been stored in the memory. In some examples, the first node notifies the second node that the data has been stored in the memory by sending a pointer (e.g., a memory pointer, such as an identification of a memory location) to the second node so that the second node can access the data from where the first node stored the data. In some examples, the first node would send the data directly to the second node so that the second node would not need to access a memory based on data received from the first node.

Memory 120 can include a computer readable medium ((e.g., non-transitory or transitory computer readable medium) usable to store (e.g., configured to store, assigned to store, and/or that stores) program instructions executable by processor subsystem 110 to cause compute system 100 to perform various operations described herein. For example, memory 120 can store program instructions to implement the functionality associated with methods 800, 900, 1000, 11000, 12000, 1300, 1400, and 1500 described below.

Memory 120 can be implemented using different physical, non-transitory memory media, such as hard disk storage, floppy disk storage, removable disk storage, flash memory, random access memory (RAM SRAM, EDO RAM, SDRAM, DDR SDRAM, RANIBUS RAM, or the like), read only memory (PROM, EEPROM, or the like), or the like. Memory in compute system 100 is not limited to primary storage such as memory 120. Compute system 100 can also include other forms of storage such as cache memory in processor subsystem 110 and secondary storage on I/O device 140 (e.g., a hard drive, storage array, etc.). In some examples, these other forms of storage can also store program instructions executable by processor subsystem 110 to perform operations described herein. In some examples, processor subsystem 110 (or each processor within processor subsystem 110) contains a cache or other form of on-board memory.

I/O interface 130 can be any of various types of interfaces configured to communicate with other devices. In some examples, I/O interface 130 includes a bridge chip (e.g., Southbridge) from a front-side bus to one or more back-side buses. I/O interface 130 can communicate with one or more I/O devices (e.g., I/O device 140) via one or more corresponding buses or other interfaces. Examples of I/O devices include storage devices (hard drive, optical drive, removable flash drive, storage array, SAN, or their associated controller), network interface devices (e.g., to a local or wide-area network), sensor devices (e.g., camera, radar, LiDAR, ultrasonic sensor, GPS, inertial measurement device, or the like), and auditory or visual output devices (e.g., speaker, light, screen, projector, or the like). In some examples, compute system 100 is communicating with a network via a network interface device (e.g., configured to communicate over Wi-Fi, Bluetooth, Ethernet, or the like). In some examples, compute system 100 is directly or wired to the network.

Figure 2:
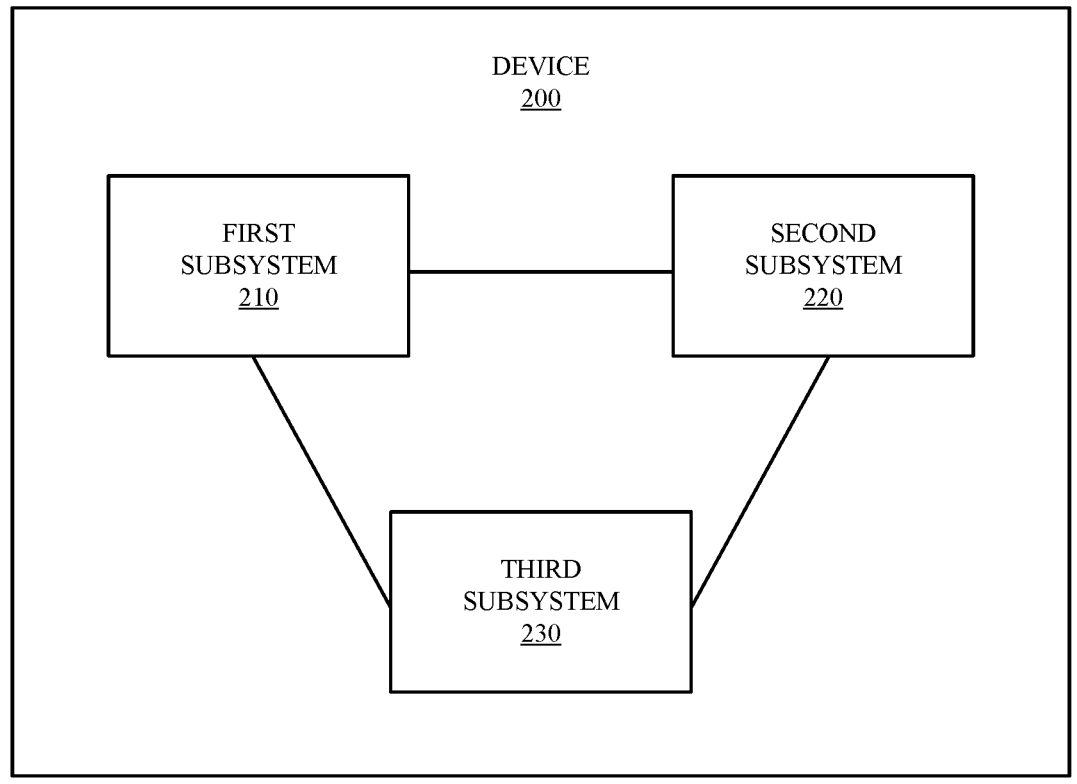
FIG. 2 is a block diagram illustrating a device with interconnected subsystems.

FIG. 2 illustrates a block diagram of device 200 with interconnected subsystems. In the illustrated example, device 200 includes three different subsystems (i.e., first subsystem 210, second subsystem 220, and third subsystem 230) communicating with (e.g., wired or wirelessly) each other, creating a network (e.g., a personal area network, a local area network, a wireless local area network, a metropolitan area network, a wide area network, a storage area network, a virtual private network, an enterprise internal private network, a campus area network, a system area network, and/or a controller area network). An example of a possible computer architecture of a subsystem as included in FIG. 2 is described in FIG. 1 (i.e., compute system 100). Although three subsystems are shown in FIG. 2, device 200 can include more or fewer subsystems.

In some examples, some subsystems are not connected to other subsystem (e.g., first subsystem 210 can be connected to second subsystem 220 and third subsystem 230 but second subsystem 220 cannot be connected to third subsystem 230). In some examples, some subsystems are connected via one or more wires while other subsystems are wirelessly connected. In some examples, messages are set between the first subsystem 210, second subsystem 220, and third subsystem 230, such that when a respective subsystem sends a message the other subsystems receive the message (e.g., via a wire and/or a bus). In some examples, one or more subsystems are wirelessly connected to one or more compute systems outside of device 200, such as a server system. In such examples, the subsystem can be configured to communicate wirelessly to the one or more compute systems outside of device 200.

In some examples, device 200 includes a housing that fully or partially encloses subsystems 210-230. Examples of device 200 include a home-appliance device (e.g., a refrigerator or an air conditioning system), a robot (e.g., a robotic arm or a robotic vacuum), and a vehicle. In some examples, device 200 is configured to navigate (with or without user input) in a physical environment.

In some examples, one or more subsystems of device 200 are used to control, manage, and/or receive data from one or more other subsystems of device 200 and/or one or more compute systems remote from device 200. For example, first subsystem 210 and second subsystem 220 can each be a camera that captures images, and third subsystem 230 can use the captured images for decision making. In some examples, at least a portion of device 200 functions as a distributed compute system. For example, a task can be split into different portions, where a first portion is executed by first subsystem 210 and a second portion is executed by second subsystem 220.

Attention is now directed towards techniques for setting up electronic devices. Such techniques are described in the context of applications of a controller connecting with accessories. It should be recognized that other types of electronic devices can be used with techniques described herein. For example, an accessory can connect with another accessory using techniques described herein. In addition, techniques optionally complement or replace other techniques for connecting devices.

Figure 3:
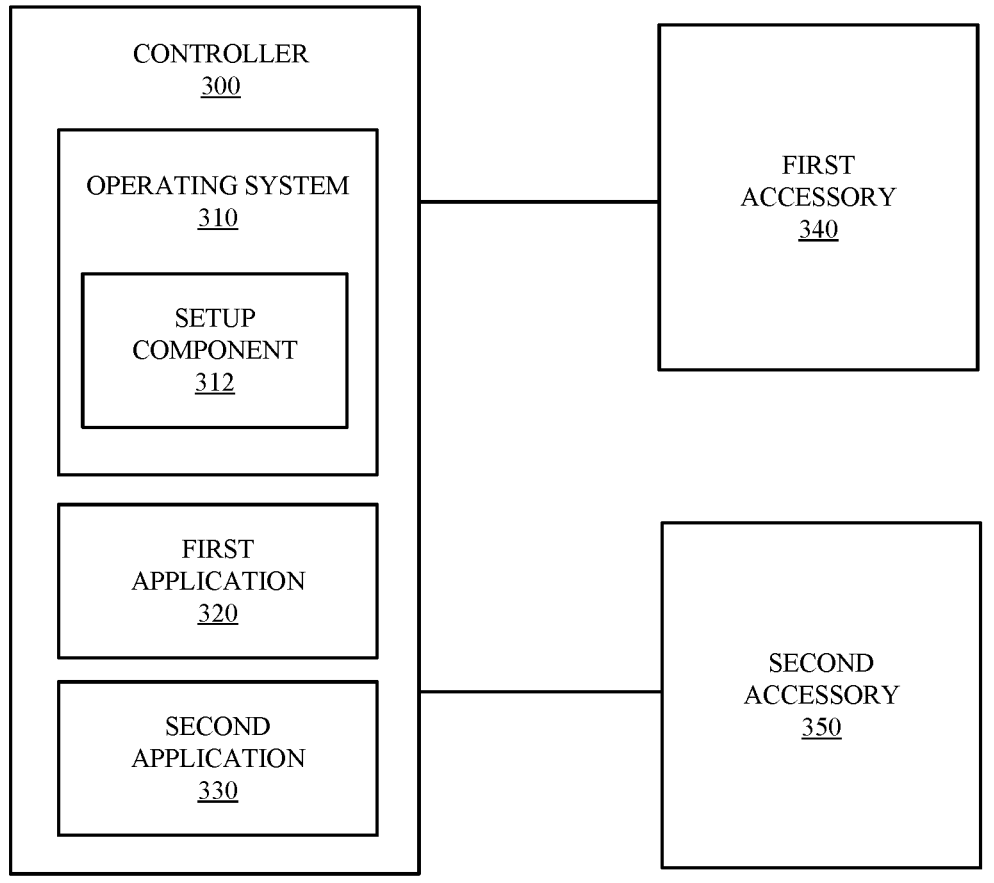
FIG. 3 is a block diagram illustrating a controller communicating with multiple accessories.

FIG. 3 is a block diagram illustrating a controller (e.g., controller 300) communicating with multiple accessories (e.g., first accessory 340 and second accessory 350). Controller 300 is a non-limiting example of a controller that can be used to perform the functionality described herein. It should be recognized that other computer architecture of a controller can be used to perform the functionality described herein. In some examples, controller 300 includes one or more features described above in relation to compute system 100 and/or device 200. In some examples, controller 300 is compute system 100 and/or device 200. In some examples, one or more features described in relation to controller 300 can be combined, substituted, and/or replaced with one or more features described in relation to compute system 100 and/or device 200. In some examples, controller 300 is a mobile device, a personal computing device, a multi-user speaker e.g., including a microphone), a single-user speaker (e.g., including a microphone), a fitness tracking device (e.g., a smart watch and/or a heart rate monitor), and/or a head-mounted display device.

As illustrated in FIG. 3, controller 300 includes operating system 310, first application 320, and second application 330. In other words, operating system 310, first application 320, and second application 330 are installed on controller 300. In some examples, first application 320 and/or second application 330 are in communication with but not installed on controller 300 (e.g., first application 320 and/or second application 330 are installed on a remote device that is communicating with controller 300). In some examples, operating system 310 manages resources of controller 300 and can be one or more operating systems as discussed above in relation to the operating system of compute system 100. For example, operating system 310 can be LINUX, iOS, or Windows operating system. In some examples, operating system 310 is an operating system for a mobile device, such as an operating system for a tablet and/or a mobile phone. In some examples, operating system 310 includes one or more operations to control a graphical user interface.

As illustrated in FIG. 3, operating system 310 includes setup component 312. Setup component 312 is configured to communicate with one or more different accessories, such as first accessory 340 and second accessory 350. In some examples, setup component 312 can configure an accessory to communicate with setup component 312 and/or another software component of the controller 300, such as first application 320 or second application 330. In some examples, all or most communications between controller 300 and an accessory are routed through setup component 312. In some examples, that first application 320 and second application 330 do not directly communicate with the accessory but, instead, send communications to setup component 312 so that setup component 312 communicates with the accessory on behalf of first application 320 and second application. In some examples, setup component 312 includes one or more instructions for performing one or more setup operations. In some examples, the one or more setup operations include operations that are performed (or that allow for an accessory to be configured) to communicate with controller 300 (and/or other controllers) and/or computer systems (e.g., having one or more features of compute system 100 and/or device 200). In some examples, setup component 312 includes operations for sending and/or receiving one or more identifiers for registering and/or controlling an accessory, such as first accessory 340 and second accessory 350. In some examples, setup component 312 is an application that is separate from operating system 310. In some examples, one or more of first application 320 and second application 330 are a part of operating system 310, irrespective of whether setup component 312 is a part of operating system 310. In some examples, the controller includes one or more applications other than first application 320 and second application 330.

At FIG. 3, first application 320 and second application 330 are different applications. In some examples, first application 320 and second application 330 correspond to different ecosystems. In some examples, an ecosystem is a smart home ecosystem, a smart office ecosystem, a smart manufacturing ecosystem, and/or a smart company ecosystem. In some examples, one or more accessories can be registered with (and/or controlled within) an ecosystem. Thus, in some examples, first application 320 and second application 330 are configured to communicate with one or more accessories. In some examples, the one or more accessories with which first application 320 is configured to communicate are different from the one or more accessories with which second application 330 is configured to communicate. In some examples, first application 320 and second application 330 communicates with an accessory by sending one or more commands (e.g., instructions and/or requests to control) to change a state of an accessory and/or receive information about a state of the accessory. In some examples, changing a state of an accessory includes changing a setting for the accessory, turning the setting off, and/or turning the setting on. In some examples, when a respective application is configured to communicate with an accessory, the respective application receives data concerning the state of the accessory, such as a value (e.g., brightness value of a light, temperature value of a thermostat, remaining battery value, overheating value, and/or fan speed of a ceiling fan) associated with the accessory or whether the accessory is on or off. In some examples, the respective application receives historical data concerning the accessory. It should be understood that first application 320 and second application 330 can be other types of applications, such as an application corresponding to a specific type of accessory and/or manufacturer (e.g., an application for controlling a light bulb), an application corresponding to multiple different ecosystems (e.g., an application corresponding to multiple different smart home ecosystems including, the Apple Home and the Google Home), and/or any other type of application (e.g., a map application, a music application, and/or a communication application).

In some examples, communications between setup component 312 and an application (e.g., first application 320 and/or second application 330) are communications within a single computer system while communications between one or more components of controller 300 (e.g., operating system 310, setup component 312, first application 320, and/or second application 330) and first accessory 340 and second accessory 350 are communications between different computer systems. Such communications between different computer systems can be wired communication and/or wireless communication. In some examples, setup component 312 (or another component of controller 300) communicates with first accessory 340 through a communication method, such as Bluetooth, Zigbee, near-field communication, WiFi, LiFi, 5G, or any other wireless communication technology. In some examples, setup component 312 (or another component of controller 300) communicates with first accessory 340 via one communication method and communicates with second accessory 350 via another communication method.

At FIG. 3, first accessory 340 and second accessory 350 are different accessory devices. Examples of an accessory include an air conditioner, an air purifier, a abridge, a camera, a doorbell, a fan, a faucet, a garage door, a humidifier, a light, a lock, an outlet, a receiver, a router, a security system, a sensor, a speaker, a sprinkler, a switch, a thermostat, a television, and/or a window. In some examples, first accessory 340 and/or second accessory 350 is a computer system that operates autonomously and/or in response to user input. In some examples, first accessory 340 and/or second accessory 350 autonomously performs one or more operations that are scheduled by a user over intervals of time, performs one or more operations that are performed due to one or more conditions being met (e.g., a threshold level of light and/or a threshold level of sound in the environment), and/or performs one or more operations that are performed in response to user input. In some of these examples, the user input is directed to the physical accessory or an application that is configured to control the accessory, such as first application 320, second application 330, and/or another application. In some examples, the controller is in communication with one or more accessories other than or in addition to first accessory 340 and second accessory 350.

Figure 4:
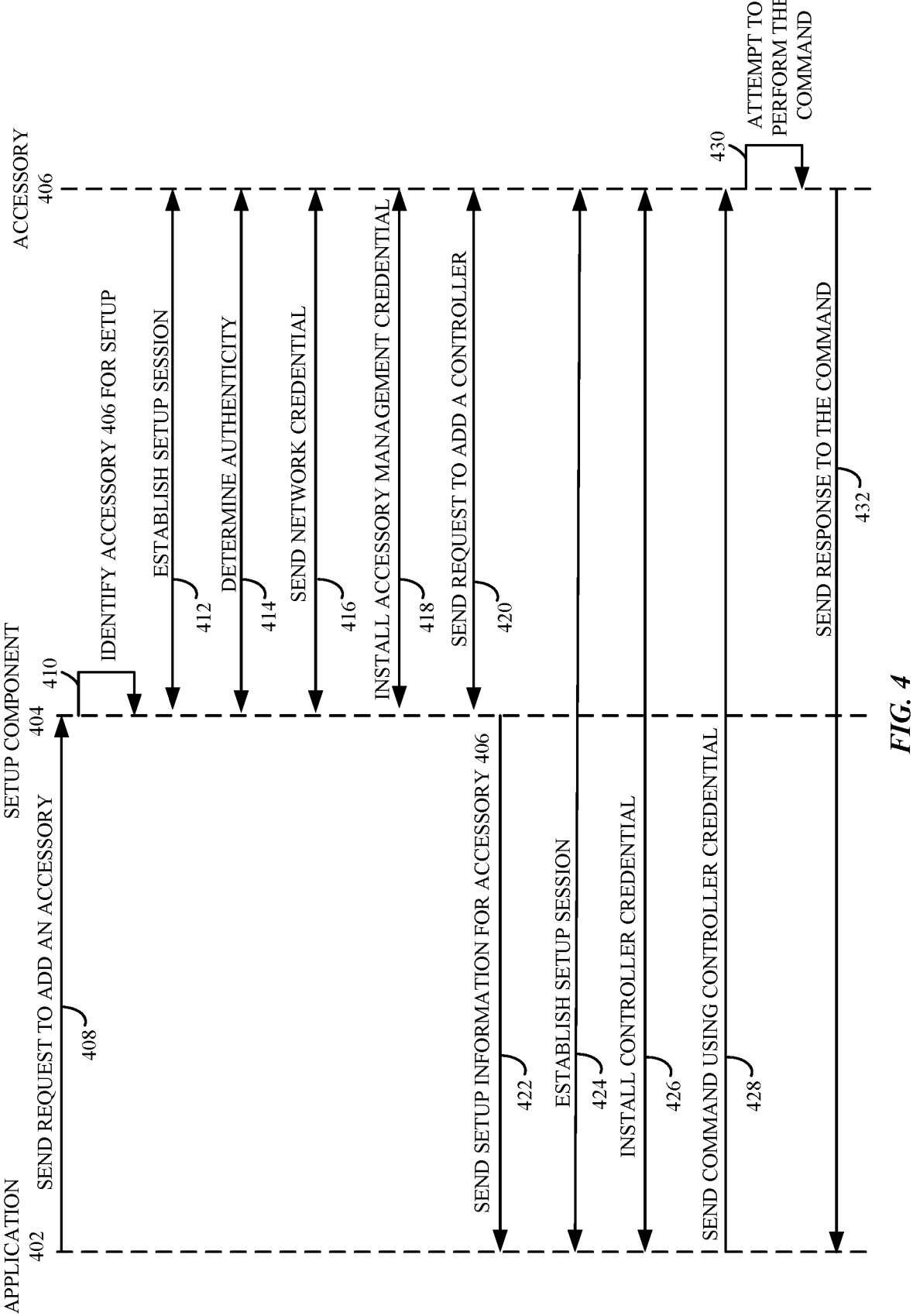
FIG. 4 is a flow diagram illustrating a technique for initially setting up an accessory using one or more communication protocols.

FIG. 4 is a flow diagram illustrating a technique for initially setting up accessory 406 using one or more communication protocols, The flow diagram includes three different entities performing operations: application 402, setup component 404, and accessory 406. Some operations in the flow diagram of FIG. 4 are, optionally, combined, performed by a different entity, the order changed, and/or omitted.

In some examples, application 402 includes one or more features described above in relation to first application 320 and/or second application 330. In some examples, setup component 404 includes one or more features described above in relation to setup component 312. In some examples, application 402 and setup component 404 are included in a controller and the controller includes one or more features described above in relation to controller 300. In some examples, accessory 406 includes one or more features described above in relation to first accessory 340 and/or second accessory 350.

FIG. 4 will be walked through twice: a first time to illustrate an example using a single communication protocol and a second time to illustrate an example using multiple communication protocols.

At 408 when using a single communication protocol, application 402 sends a request to setup component 404 to add an accessory. In some examples, the request is to add a non-specific (e.g., general) accessory to an ecosystem (e.g., a smart home ecosystem and/or smart office ecosystem) corresponding to application 402. In other examples, the request is to add a particular accessory (e.g., accessory 406) to the ecosystem corresponding to application 402. In some examples, the request includes an indication for which ecosystem to add an accessory.

In some examples, the request to add an accessory is sent in response to detection of user input. In some examples, application 402 detects selection of a user-interface object displayed by application 402 and, in response to detecting the selection, causes the request to be sent to setup component 404. In some examples, application 402 causes a camera application to be displayed, where the camera application can be used to capture an image of a pattern (e.g., a QR code or a light). In some examples, the captured image of the pattern causes the request to add an accessory to be sent. In other examples, the request at 408 when using a single communication protocol is sent in response to one or more determinations by application 402, such as determining that the accessory is within a predetermined distance (e.g., 1-20 meters) from a controller that has application 402 installed and/or determining that the accessory is connected to the same communication network as the controller that has application 402 installed. In such examples, application 402 proactively sends the request in response to the one or more determinations.

At 410 when using a single communication protocol, setup component 404 identifies accessory 406 for setup. In some examples, such identifying is performed in response to receiving the request at 408 when using a single communication protocol. For example, the request can include an identifier of accessory 406 and/or initiate a process for setup component 404 to identify accessory 406. In some examples, the process for setup component to identify accessory 406 (1) requires a user to enter a manual code corresponding to accessory 406, (2) causes a controller to display a camera application that can capture an image of a pattern ((e.g., a QR code, a light pattern, or any other visual pattern) corresponding to accessory 406, and/or (3) discovers accessory 406 by monitoring wired and/or wireless communications (e.g., Bluetooth, WiFi, NFC, UWB, probes, beacons, or any other type of communication that would alert setup component 404 of accessory 406). In some examples, such identification of accessory 406 occurs before receiving the request at 408 (e.g., identification occurs preemptively by setup component 404), using any techniques described above.

At 412 when using a single communication protocol, a setup session (e.g., a secure session or an unsecure session) is established between setup component 404 and accessory 406. In some examples, the setup session is established by setup component 404; in other examples, the setup session is established by accessory 406.

In some examples, establishing the setup session requires multiple communications to be sent back and forth between setup component 404 and accessory 406, such as communications to configure the setup session and/or to ensure that the setup session is secure. In some examples, the setup session is established based on a communication protocol supported by accessory 406. For example, an advertisement received by setup component 404 when identifying accessory 406 and/or when establishing the setup session can indicate a particular communication protocol that is then used for the setup session.

In some examples, establishing the setup session includes establishing a communication channel between setup component 404 and accessory 406. The communication channel can use any wireless communication technology, such as Bluetooth, Zigbee, near-field communication, LiFi, or 5G. In some examples, the setup session is a pairing session to establish a pairing between setup component 404 and accessory 406 (e.g., to register information (e.g., device information) on each side of the pair to be able to easily connect).

At 414 when using a single communication protocol, setup component 404 and/or accessory 406 determines that the other is authentic. For example, setup component 404 can determine that accessory 406 is the type of accessory claimed by accessory 406 (e.g., through a signature or other credential provided by accessory 406 to setup component 404, through data provided by a different device (e.g., a server associated with setup component 404 or accessory 406) to setup component 404, and/or through receiving input (e.g., user input, such as selection of a user-interface element) corresponding to confirmation that accessory 406 is authentic). For another example, accessory 406 can determine that setup component 404 is al lowed to connect with accessory 406 (e.g., through a signature or other credential provided by setup component 404 to accessory 406, through data provided by a different device (e.g., a server associated with setup component 404 or accessory 406) to accessory 406, and/or through receiving input (e.g., user input, such as press of a physical button of accessory 406) corresponding to confirmation that setup component 404 is authentic).

At 416 when using a single communication protocol, setup component 404 sends a network credential to accessory 406. In some examples, the network credential corresponds to a network (e.g., a % Ft network or a thread network) for which the controller is connected. In such examples, the network credential is sent to accessory 406 so that accessory 406 can connect to the network. It should be recognized that the network credential can also be a network credential for a network intended to be used by only setup component 404 and either accessory 406 or any accessory communicating with setup component 404.

At 418 when using a single communication protocol, setup component 404 installs a credential (sometimes referred to as an accessory management credential) on accessory 406 so that setup component 404 can manage, configure, and/or control accessory 406. Examples of the credential include a long-term key, an ecosystem credential, a certificate (e.g., root, intermediate, or other type of certificate), and an administrator credential. In some examples, the credential is specific to a user (e.g., a user account), an ecosystem, and/or a computer system (e.g., a controller). In some examples, the credential is added to accessory 406 using a setup code received in the request at 408 or the communications at 410. In such examples, the setup code is not generated by setup component 404 and instead is provided to setup component 404 as corresponding to accessory 406. In some examples, the setup code is used to establish a mutually authenticated bidirectional secure channel between setup component 404 and accessory 406. Over the secure channel, the credential (e.g., the accessory management credential) is installed. In some examples, setup component 404 uses the credential to create secure sessions for other (e.g., further) communication with accessory 406.

In some examples, installing the credential creates or adds accessory 406 to an administrative ecosystem. In some examples, the administrative ecosystem is configured to be a lightweight ecosystem that has limited permissions and/or entitlements with respect to accessory 406. For example, the lightweight ecosystem can allow for setup component 404 to add additional ecosystems but not control accessory 406. For another example, the lightweight ecosystem can restrict resources of accessory 406 used with respect to the lightweight ecosystem. In such an example, the restricted resources result in less memory allowed for storing code related to the lightweight ecosystem, less memory made available for execution of operations corresponding to the lightweight ecosystem, and/or less priority when executing operations corresponding to the lightweight ecosystem, as compared to a different type of ecosystem. In other examples, the administrative ecosystem is configured to be an enhanced ecosystem (e.g., a full ecosystem) that has an enhanced set of permissions and/or entitlements (e.g., full set of permissions and/or entitlements) with respect to accessory 406, as compared to the lightweight ecosystem. For example, the enhanced ecosystem can allow for setup component 404 to add additional ecosystems and/or control accessory 406. In some examples, the administrative ecosystem is different from the ecosystem described above with respect to 408. In particular, the administrative ecosystem is an ecosystem that is first established for accessory 406 and other ecosystems (e.g., the ecosystem mentioned with respect to 408 when using a single communication protocol) are added using the administrative ecosystem.

At 420 when using a single communication protocol, setup component 404 sends a request to accessory 406 to add a controller, such as a new computer system to configure and/or control accessory 406, a new ecosystem, and/or a new administrator (each of which includes a different set of entitlements). In some examples, the request to add a controller includes a secret that is generated by application 402 or setup component 404. In such examples, the secret is used by a component (e.g., application 402 or setup component 404, including by application 402 when generated by setup component 404) to identify itself when adding a credential to accessory 406 example, the secret can be a piece of data known only by devices, computer systems, and/or components in which are in the new ecosystem (e.g., devices, computer systems, and/or components for which are participating in a secure communication, such as application 402 and accessory 406). In some examples, the secret is provided to setup component 404 by application 402. In such examples, the secret can be encrypted in a manner that setup component 404 is unable to identify the secret but accessory 406 is able to identify the secret when receiving the encrypted secret from setup component 404. An example of the secret generated by setup component 404 is a setup code as discussed above. In some examples, the secret is used to establish a mutually, authenticated bidirectional secure channel between a component (e.g., application 402 or setup component 404) and accessory 406. Over the secure channel, a credential (e.g., an accessory management credential or a controller credential as described herein) is installed. In some examples, application 402 or setup component 404 uses the credential to create secure sessions for other (e.g., further) communication with accessory 406.

At 422 when using a single communication protocol, setup component 404 sends setup information to application 402, where the setup information corresponds to accessory 406. In some examples, the setup information includes an identifier and/or address of accessory 406 (e.g., an IP address, a MAC address, a name, and/or any other identifying information of accessory 406) and/or the secret generated by setup component 404 and sent to accessory 406. In such examples, the setup information is used by application 402 to communicate with accessory 406.

At 424 when using a single communication protocol, a setup session (e.g., a secure session or an unsecure session) is established between application 402 and accessory 406. The setup session can be established by either application 402 or accessory 406. In some examples, the setup session is established through multiple communications between application 402 and accessory 406, such as communications to configure the setup session and/or to ensure that the setup session is secure. In some examples, the setup session is a communication channel between application 402 and accessory 406. The communication channel can use any wireless communication technology, such as Bluetooth, Zigbee, near-field communication, WiFi, LiFi, or 5G.

At 426 when using a single communication protocol, application 402 installs a credential (e.g., a controller credential) on accessory 406 so that application 402 can configure and/or control accessory 406. Examples of the controller credential include the same examples as described above for the accessory management credential. In some examples, the controller credential has the same level of privileges as the accessory management credential. In some examples, installing the credential creates or adds accessory 406 to a different ecosystem than described above with respect to setup component 404. In such examples, the ecosystem for application 402 can be configured to be an enhanced ecosystem that has enhanced permissions and/or entitlements with respect to accessory 406. For example, the enhanced ecosystem allows for application 402 to add additional ecosystems and/or control accessory 406. In such an example, the enhanced ecosystem can be allowed to take up more bandwidth of accessory 406 than a lightweight ecosystem and/or use more resources (e.g., short-term and/or long-term memory).

At 428 when using a single communication protocol, application 402 sends a command (e.g., an instruction and/or a request to control) to accessory 406. In some examples, the command is to change a state of accessory 406 and/or receive information about a state of accessory 406. Examples of changing a state of accessory 406 include changing a setting for accessory 406, turning the setting off, turning accessory 406 off, turning the setting on, and/or turning accessory 406 on. In some examples, the command is sent based on the communication protocol used by application 402 to communicate with accessory 406 using the credential installed in 426 when using a single communication protocol. In some examples, the command is not sent through setup component 404 and, instead, is sent directly from application 402 to accessory 406.

At 430 when using a single communication protocol, accessory 406 attempts to perform the command received at 428. At 432 when using a single communication protocol, accessory 406 sends a response to the attempt to perform the command. In some examples, the response indicates whether the command was successfully performed. In some examples, the response is sent based on the communication protocol used by application 402 to communicate with accessory 406. In some of these examples, the response is not sent through setup component 404 and, instead, is sent directly from accessory 406 to application 402.

In some examples, application 402 receives data concerning a state of accessory 406, such as a value (e.g., brightness value of a light, temperature value of a thermostat, remaining battery value, overheating value, and/or fan speed of a ceiling fan) associated with accessory 406 or whether accessory 406 is on or off. In some of these examples, such data is sent from accessory 406 to application 402 based on a triggering event occurring on accessory 406 and without a request for such data from application 402. Examples of the triggering event include a temperature value reaching a threshold, a remaining battery value reaching a threshold, and an error occurring.

As mentioned above, FIG. 4 will be walked through a second time below assuming multiple communication protocols. For example, accessory 406 supports multiple communication protocols, communicates with setup component 404 with a first communication protocol, and communicates with application 402 with a second communication protocol that is different from the first communication protocol.

At 408 when using multiple communication protocols, application 402 sends a request to setup component 404 to add an accessory. In some examples, details of 408 when using multiple communication protocols are the same as the details that were described above with respect to 408 using a single communication protocol.

At 410 when using multiple communication protocols, setup component 404 identifies accessory 406 for setup. In some examples, details of 410 when using multiple communication protocols are similar to details of 410 described above using a single communication protocol except that setup component 404 identifies communication protocols supported by accessory 406. Such identification allows for setup component 404 to select a communication protocol to use when communicating with accessory 406. In some examples, the communication protocol used by setup component 404 is different from a communication protocol used by application 402 to communicate with accessory 406. The different communication protocol can have different levels of security and/or privacy. Thus, in some examples, communications sent or received by setup component 404 are sent via a communication protocol that has a particular level of security and/or privacy required by setup component 404. In some examples, setup component 404 supports a first communication protocol that is not used by application 402 to communicate with accessory 406 and a second communication protocol that is used by application 402 to communicate with accessory 406. In some examples, instead of forcing setup component 404 to use the second communication protocol when communicating with accessory 406, setup component 404 can use the first communication protocol when communicating with accessory 406. In some examples, a user of the controller selects which communication protocol is used by setup component 404.

At 412 when using multiple communication protocols, a setup session (e.g., a secure session or an unsecure session) is established between setup component 404 and accessory 406. In some examples, details of 412 when using multiple communication protocols are similar to details of 412 when using a single communication protocol described above except that the communication protocol selected in 410 when using multiple communication protocols is used for the setup session. Similarly, in some examples, details of 414 and 416 when using multiple communication protocols are similar to details of 414 and 416 when using a single communication protocol described above, respectively, except that the communication protocol selected in 410 when using multiple communication protocols is used.

At 418 when using multiple communication protocols, setup component 404 installs a credential (e.g., an accessory management credential) on accessory 406 so that setup component 404 can manage, configure, and/or control accessory 406. In some examples, details of 418 when using multiple communication protocols are similar to details of 418 when using a single communication protocol described above except that the communication protocol selected in 410 when using multiple communication protocols is used to communicate with accessory 406, as discussed further below.

In some examples, a request to install the credential sent by setup component 404 is encapsulated in a message based on the communication protocol selected in 410 when using multiple communication protocols, where the request is based on the communication protocol used by application 402 to communicate with accessory 406. In other words, the transport of the request uses the communication protocol selected in 410 when using multiple communication protocols and the payload that is received by accessory 406 uses the communication protocol used by application 102.

In other examples, the request to install the credential sent by setup component 404 is based on the communication protocol selected in 410 when using multiple communication protocols such that the credential is installed using that communication protocol and then communications related to application 402 (e.g., 420, discussed below) at least partially use the communication protocol used by application 402.

At 420 when using multiple communication protocols, setup component 404 sends a request to accessory 406 to add a controller, such as a new computer system to configure and/or control accessory 406, a new ecosystem, and/or a new administrator (each of which includes a different set of entitlements). In some examples, details of 418 when using multiple communication protocols are the same as details of 418 when using a single communication protocol described above, including that the communication protocol used by application 402 is used to communicate the request at 420 when using multiple communication protocols. In other examples, details of 418 when using multiple communication protocols are similar to details of 418 when using a single communication protocol described above except that the communication protocol selected in 410 when using multiple communication protocols is used to communicate with accessory 406. For example, the request to add a controller is encapsulated in a message based on the communication protocol selected in 410 when using multiple communication protocols, where the request is based on the communication protocol used by application 402 to communicate with accessory 406. In other words, the transport of the request uses the communication protocol selected in 410 when using multiple communication protocols and the payload that is received by, accessory 406 uses the communication protocol used by application 402.

In some examples, details of the rest of the operations in FIG. 4 when using multiple communication protocols are the same as details described above with respect to FIG. 4 when using a single communication protocol. For example, details of 422, 424, 426, 428, 430, and 432 when using multiple communication protocols can be the same as details described above when using a single communication protocol for 422, 424, 426, 428, 430, and 432, respectively.

Figure 5A:
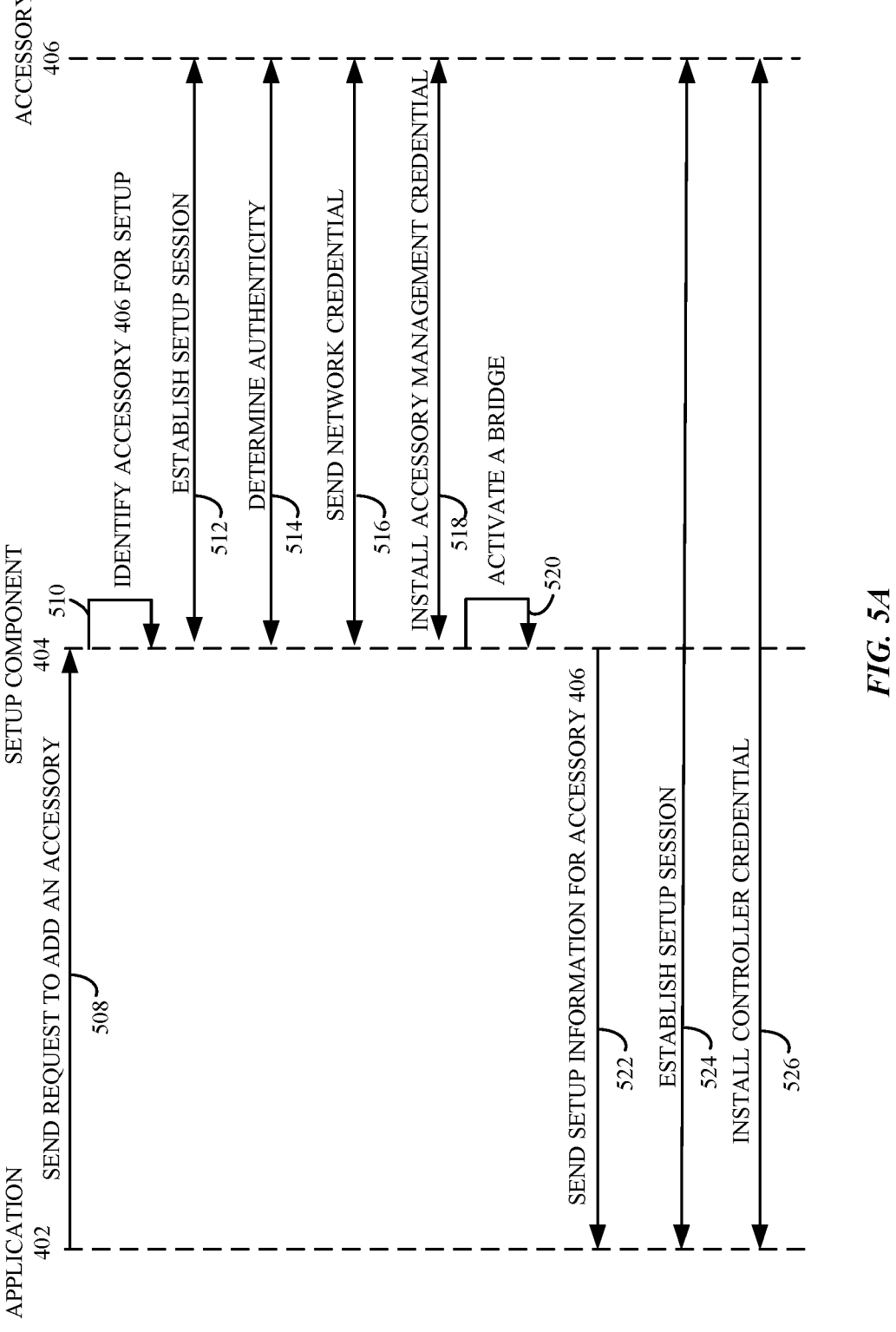
FIG. 5A is a flow diagram illustrating a technique for initially setting up an accessory using a setup component as a bridge.

FIG. 5A is a flow diagram illustrating a technique for initially setting up accessory 406 using setup component 406 as a bridge. In some examples, setup component 404 acts as a bridge because application 402 is (1) not configured to communicate using a communication protocol supported by accessory 406 and/or (2) not allowed by a computer system including application 402 (e.g., a controller, such as controller 300). Instead, application 402 communicates with setup component 404 so that setup component 404 communicates with accessory 406 on behalf of application 402. Some operations in the flow diagram of FIG. 5A are, optionally, combined, performed by a different entity, the order changed, and/or omitted.

Similar to FIG. 4, in some examples: application 402 of FIG. 5A includes one or more features described above in relation to first application 320 and/or second application 330, setup component 404 of FIG. 5A includes one or more features described above in relation to setup component 312, application 402 of FIG. 5A and setup component 404 of FIG. 5A are included in a controller and the controller includes one or more features described above in relation to controller 300, and accessory 406 of FIG. 5A includes one or more features described above in relation to first accessory 340 and/or second accessory 350.

In some examples, details of 508, 510, 512, 514, 516, and 518 are the same as details described above with respect to 408, 410, 412, 414, 416, and 418, respectively.

At 520, setup component 404 activates a bridge (sometimes referred to as an adapter) to facilitate (e.g., translate) communications from application 402 to accessory 406. In some examples, the bridge uses the accessory management credential to communicate with accessory 406 on behalf of application 402. In such examples, 524 and 526 can be omitted and application 402 communicates with setup component 404 as if setup component 404 is accessory 406. In other examples, the bridge adds a new credential on behalf of application 402 and uses the new credential to communicate with accessory 406, as described below.

At 522, setup component 404 sends setup information to application 402. At 522, the setup information corresponds to setup component 404 (e.g., instead of accessory 406 as described above with respect to FIG. 4). In some examples, the setup information includes an identifier and/or address of setup component 404, a secret (e.g., a setup code) generated by setup component 404 (e.g., the secret generated by setup component 404 at 420), and/or information for how to communicate with setup component 404 using a communication protocol supported by application 402. In such examples, the setup information is used by application 402 to communicate with accessory 406 through setup component 404.

At 524, a setup session (e.g., a secure session or an unsecure session) is established between application 402 and setup component 404. The setup session can be established by either application 402 or setup component 404. In some examples, the setup session is established through multiple communications between application 402 and setup component 404, such as communications to configure the setup session and/or to ensure that the setup session is secure. In some examples, the setup session is a communication channel between application 402 and setup component 404.

In some examples, establishing the setup session between application 402 and setup component 404 causes setup component 404 to establish another setup session between setup component 404 and accessory 406. The other setup session can be established by either setup component 404 or accessory 406. In some examples, the other setup session is established through multiple communications between setup component 404 and accessory 406, such as communications to configure the setup session and/or to ensure that the setup session is secure. In some examples, the setup session is a communication channel between setup component 404 and accessory 406. The communication channel can use any wireless communication technology, such as Bluetooth, Zigbee, near-field communication, WiFi, LiFi, or 5G.

At 526, application 402 installs a credential (e.g., a controller credential) on accessory 406 through setup component 404 so that application 402 can configure and/or control accessory 406 through setup component 404. Examples of the credential include the same examples as the accessory management credential described above. In some examples, installing the credential through setup component 404 includes application 402 sending a request to setup component 404 to install the credential and then setup component 404 installing the credential on accessory 406, similar to as described above with respect to installing the accessory management credential.

Figure 5B:
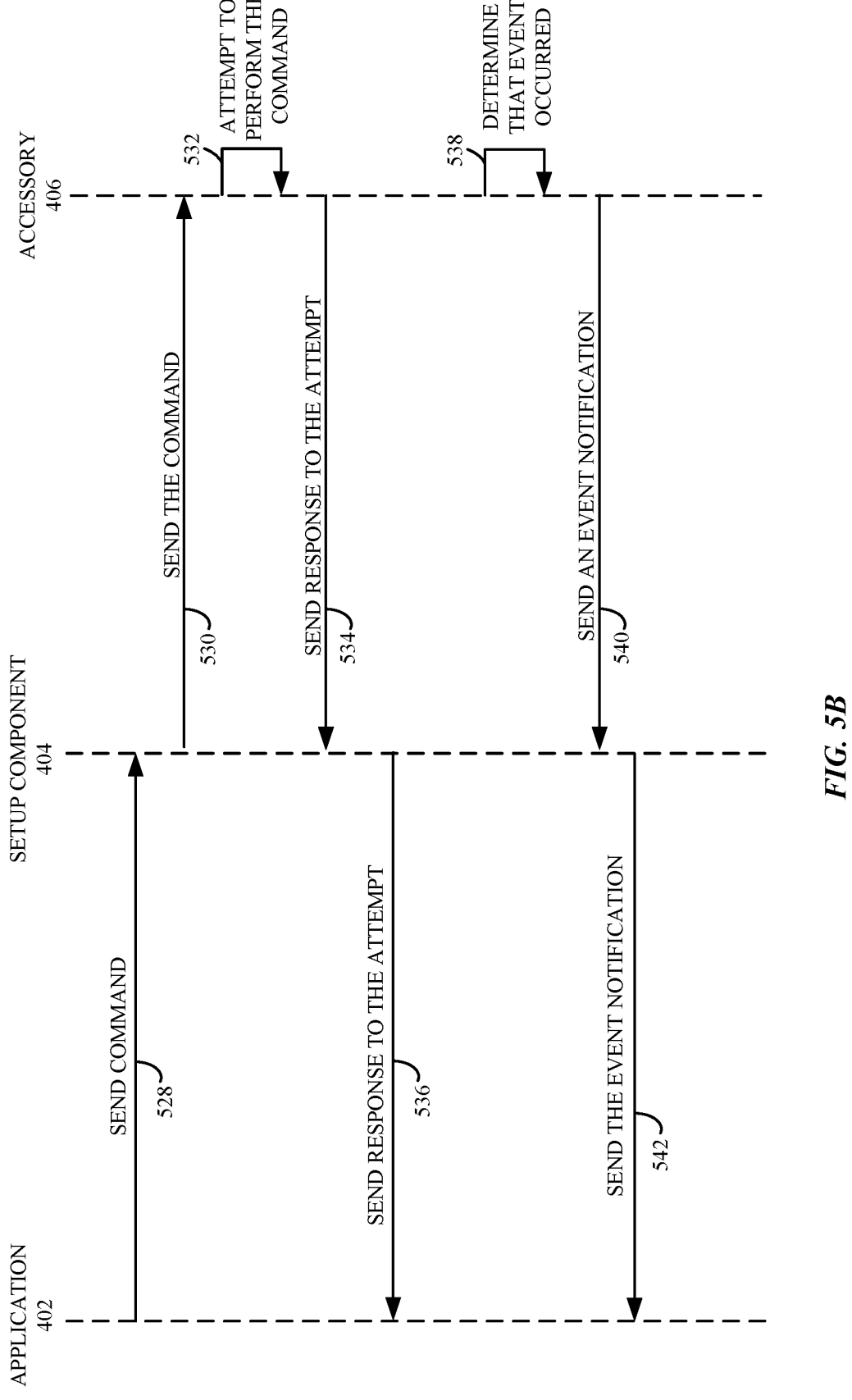
FIG. 5B is a flow diagram illustrating a technique for communicating with a setup component as a bridge.

In some examples, installing the credential creates or adds accessory 406 to a different ecosystem than described above with respect to setup component 404 at 518. In such examples, the ecosystem for application 402 can be configured to be an enhanced ecosystem that has enhanced permissions and/or entitlements with respect to accessory 406. For example, the enhanced ecosystem can allow for application 402 to add additional ecosystems and/or control accessory 406. In such an example, the enhanced ecosystem can be allowed to take up more bandwidth of accessory 406 than a lightweight ecosystem and/or use more resources (e.g., short-term and/or long-term memory), FIG. 5B is a flow diagram illustrating a technique for communicating with setup component 406 as a bridge. In some examples, FIG. 5B is a continuation of FIG. 5A. In some examples, setup component 404 acts as a bridge because application 402 is (1) not configured to communicate using a communication protocol supported by accessory 406 and/or (2) not allowed by a computer system including application 402 (e.g., a controller, such as controller 300). Instead, application 402 communicates with setup component 404 so that setup component 404 communicates with accessory 406 on behalf of application 402. Some operations in the flow diagram of FIG. 5B are, optionally, combined, performed by a different entity, the order changed, and/or omitted.

At 528, application 402 sends a command (e.g., an instruction and/or a request to control) to setup component 404 to be sent to accessory 406. In some examples, the command is to change a state of accessory 406 and/or receive information about a state of accessory 406. Examples of changing a state of accessory 406 include changing a setting for the accessory, turning the setting off, and/or turning the setting on. In some examples, the command is sent based on the communication protocol used by application 402 to communicate with setup component 404.

At 530, setup component 404 sends the command to accessory 406 using a credential installed by setup component 404 (e.g., the credential installed at 518 or 526). In some examples, setup component 404 converts the command according to the communication protocol used by setup component 404 to communicate with accessory 406 and then sends the converted command to accessory 406.

At 532, accessory 406 attempts to perform the command received at 530. At 534, accessory 406 sends a response to the attempt to perform the command. In some examples, the response indicates whether the command was successfully performed. In some examples, the response is sent based on the communication protocol used by accessory 406 to communicate with setup component 404.

At 536, setup component 404 sends the response to application 402. In some examples, setup component 404 converts the response according to the communication protocol used by setup component 404 to communicate with application 402 and sends the converted command to application 402.

At 538, accessory 406 determines that an event occurred that requires notifying application 402. For example, a light can be turned off or an amount of remaining battery can reach a threshold.

At 540, accessory 406 sends an event notification to setup component 404. In some examples, the event notification is sent based on the communication protocol used by accessory 406 to communicate with setup component 404.

At 542, setup component 404 sends the event notification to application 402. In some examples, setup component 404 converts the event notification according to the communication protocol used by setup component 404 to communicate with application 402 and then sends the converted event notification to application 402.

FIG. 6 is a flow diagram illustrating a method for initial setup of an accessory from the perspective of a setup component in accordance with some embodiments. Method 600 is performed at a setup component (e.g., 312, 404) (e.g., an operating-system component or an application different from an operating system) of a computer system (e.g., 100, 200, 300). In some examples, the computer system is a watch, a phone, a tablet, a processor, a head-mounted display (FWD) device, and/or a personal computing device.

At 610, the setup component receives an indication of an accessory (e.g., 340, 350, 406) (e.g., an identifier and/or an address of the accessory) (e.g., 408, 410), where the accessory is different from the computer system. In some examples, the accessory is an air conditioner, an air purifier, a bridge, a camera, a doorbell, a fan, a faucet, a garage door, a humidifier, a light, a lock, an outlet, a receiver, a router, a security system, a sensor, a speaker, a sprinkler, a switch, a thermostat, a television, an actuator, and/or a window.

In response to receiving the indication, at 620, the setup component sends, to the accessory (e.g., via a communication channel (e.g., 412) (e.g., a secure or unsecured communication channel) established between the setup component and the accessory), a first credential (e.g., an accessory management credential, such as a certificate and/or identifier corresponding to the setup component) to grant (e.g., allow, configure, and/or enable) the setup component one or more first entitlements (e.g., one or more rights, permissions, and/or abilities) with respect to the accessory (e.g., establish a first ecosystem and/or manage the accessory) (e.g., 418). In some examples, the first ecosystem is a grouping of one or more accessories and one or more controllers (e.g., a device, a computer system, an application executing on a device, and/or a software process configured to control an accessory).

After sending the first credential, at 630, the setup component sends, to the accessory using the first credential (e.g., a message sent to the accessory can include the first credential and/or an indication of the first credential), a request to add a second credential to grant one or more second entitlements (e.g., the one or more second entitlements are the same as the one or more first entitlements or are different from the one or more first entitlements (e.g., at least one different entitlement of the one or more first entitlements)) with respect to the accessory (e.g., add a device to control the accessory, a second ecosystem different from the first ecosystem, a credential to control the accessory, and/or an administrator different from the setup component), where the second credential is different from the first credential. In some examples, the second ecosystem is a grouping of one or more accessories and one or more controllers (e.g., a device, a computer system, an application executing on a device, and/or a software process configured to control an accessory).

After sending the first credential, at 640, the setup component sends, to an application (e.g., 320, 330, 402) of the computer system, setup information for the accessory (e.g., 422), where the setup information is intended to (e.g., can) be used by the application to communicate with the accessory to grant the application the one or more second entitlements with respect to the accessory, and where the application is different from the setup component. In some examples, the indication is sent to the setup component by the application. In some examples, the indication is sent to the setup component by an operating-system component (e.g., different from the setup component) of the computer system. In some examples, the indication is sent to the setup component by a second application different from the application. In some examples, the application communicates with the accessory without going through the setup component. In some examples, the application is an application of an ecosystem that allows for a user to control one or more accessories (including, for example, accessories of different types and/or from different manufacturers), an application of an accessory manufacturer that allows for a user to control one or more accessories associated with the accessory manufacturer, and/or an application for a particular communication protocol (e.g., the application communicates according to the particular communication protocol to accessories that are configured for the particular communication protocol).

In some examples, the first one or more entitlements correspond to a first ecosystem and not a second ecosystem. In some examples, the indication of the accessory is received within a request to add the accessory to the second ecosystem. In some examples, the second one or more entitlements correspond to the second ecosystem and not the first ecosystem. In some examples, the first ecosystem is a grouping of one or more accessories and one or more controllers (e.g., a device, a computer system, an application executing on a device, and/or a software process configured to control an accessory). In some examples, the second ecosystem is a grouping of one or more accessories and one or more controllers (e.g., a device, a computer system, an application executing on a device, and/or a software process configured to control an accessory).

In some examples, the indication of the accessory is determined from an image (e.g., an image of a pattern (e.g., a QR code or a light) corresponding to the accessory and/or data corresponding to an image and/or a symbol) (and, in some examples, from a portion of an image that does not include text) captured by a camera in communication with the computer system (e.g., a camera (e.g., a telephoto, wide-angle, ultra-wide-angle camera) of the computer system); or received, via a communication channel, from a device (e.g., a watch, a phone, a tablet, a processor, a head-mounted display (HMD) device, an accessory, a component attached to an accessory, a component of an accessory, and/or a personal computing device) different from the computer system. In some examples, the communication channel is Bluetooth, Wi-Fi, an internet protocol communication channel, NFC, or UWB.

In some examples, the request is received from the application (e.g., before sending and/or transmitting the request).

In some examples, the setup information includes a setup code or (e.g., and/or) an address of the accessory. In some examples, the address is a name, an internet protocol address, a media access control address, and/or a unique identifier of the accessory. In some examples, the setup code is a set of one or more numbers, symbols, images, and/or one or more characters used to establish a link (e.g., a pairing) with the accessory. In some examples, the setup information is generated by the computer system. In some examples, the setup information is received from (and/or generated by) the accessory.

In some examples, the setup component selects a first communication protocol (e.g., a communication protocol supported by the setup component but not supported by the application) from a plurality of communication protocols (e.g., a communication protocol (e.g., Bluetooth, an internet protocol communication protocol, NI-T, and/or UWB) supported by the setup component but not supported by the application, a communication protocol supported by the application, a communication protocol corresponding to an ecosystem, a communication protocol corresponding to the setup component, and/or a communication protocol supported by a plurality of different ecosystems) supported by the accessory (e.g., the selecting occurs when the accessory supports multiple communication protocols and/or the setup component is acting as a bridge). In some examples, the setup information is sent to the accessory in a message according to the first communication protocol. In some examples, the one or more second entitlements correspond to a second communication protocol (e.g., a communication protocol (e.g., Bluetooth, an internet protocol communication protocol, NI-T, and/or UWB) supported by the application) of the plurality of communication protocols. In some examples, the second communication protocol is different from the first communication protocol. In some examples, the selecting occurs before or after sending the first credential and/or after receiving the indication of the accessory.

In some examples, the setup component receives, from the application, a command to change a state (e.g., on or off or an amount or value of a setting) of the accessory. In some examples, the setup component generates, according to (e.g., based on and/or via) a particular communication protocol (e.g., a communication protocol (e.g., Bluetooth, an internet protocol communication protocol, NFC, and/or UWB) supported by the accessory), a message corresponding to the command (e.g., including the command or including a different command that has the effect of changing the state of the accessory the same as the command). In some examples, the setup component sends, to the accessory, the message. In some examples, the accessory does not support a communication protocol supported by the accessory (e.g., even when the accessory only supports a single communication protocol) and the setup component converts a message received from the application to the single communication protocol before sending to the accessory. In some examples, sending the message to the accessory causes the accessory to perform an operation based on the content of the message, and In some examples, the operation causes the accessory to change from a first state, on state, off state, low state, high state, state that is based on a first value (e.g., −100-100, 0-100%, low, medium, and/o to a second state that is different from the first state.

Note that details of the processes described above with respect to method 600 (e.g., FIG. 6) are also applicable in an analogous manner to the methods described below. For example, method 700 optionally includes one or more of the characteristics of the various methods described above with reference to method 600. For example, the setup component of FIG. 7 can be the setup component of FIG. 6. For brevity, these details are not repeated below.

Figure 7:
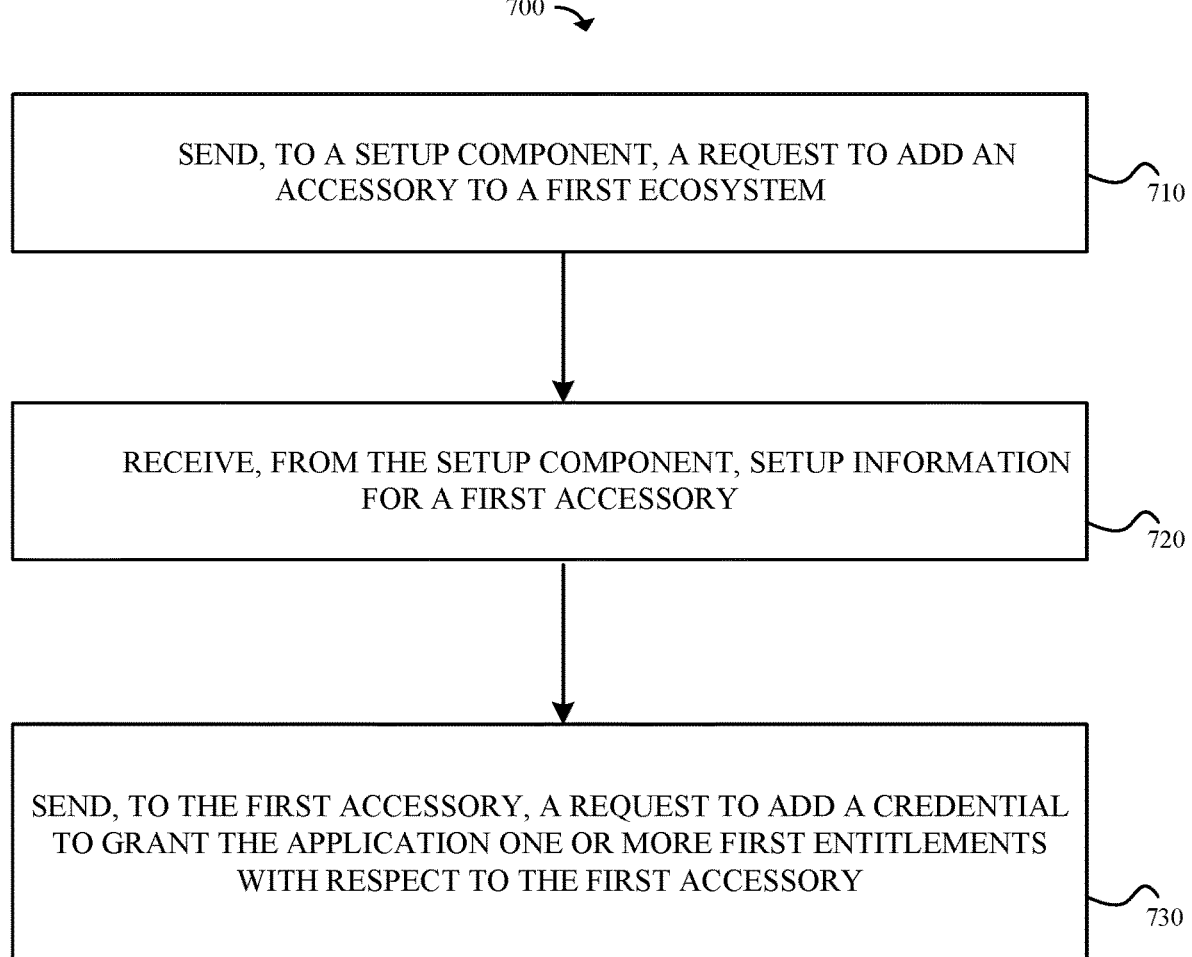
FIG. 7 is a flow diagram illustrating a method for initial setup of an accessory from the perspective of an application in accordance with some embodiments.

FIG. 7 is a flow diagram illustrating a method for initial setup of an accessory from the perspective of an application in accordance with some embodiments. Method 700 is performed at an application (e.g., 320, 330, 402) (e.g., different from an operating system) of a computer system (e.g., 100, 200, 300). In some examples, the application is an application of an ecosystem that allows for a user to control one or more accessories (including, for example, accessories of different types and/or from different manufacturers), an application of an accessory manufacturer that allows for a user to control one or more accessories associated with the accessory manufacturer, and/or an application for a particular communication protocol (e.g., the application communicates according to the particular communication protocol to accessories that are configured for the particular communication protocol). In some examples, the computer system is a watch, a phone, a tablet, a processor, a head-mounted display (HMD) device, and/or a personal computing device.

At 710, the application sends, to a setup component (e.g., an operating-system component or an application different from an operating system) of the computer system, a request to add an accessory (e.g., a request to generally add an accessory or a request to add a particular accessory, such as via an identifier of the particular accessory) to a first ecosystem, where the setup component is different from the application. In some examples, the first ecosystem is a grouping of one or more accessories and one or more controllers (e.g., a device, a computer system, an application executing on a device, and/or a software process configured to control an accessory). In some examples, the first ecosystem is a grouping of one or more accessories and one or more controllers (e.g., a device, a computer system, an application executing on a device, and/or a software process configured to control an accessory).

After (e.g., as a result of or in conjunction with) sending the request, at 720, the application receives, from the setup component, setup information for a first accessory (e.g., an identifier, an address, and/or a setup code for the first accessory). In some examples, the first accessory is an air conditioner, an air purifier, a bridge, a camera, a doorbell, a fan, a faucet, a garage door, a humidifier, a light, a lock, an outlet, a receiver, a router, a security system, a sensor, a speaker, a sprinkler, a switch, a thermostat, a television, an actuator, and/or a window.

At 730, the application sends, to the first accessory, a request to add a credential (e.g., a certificate and/or identifier corresponding to the application) to grant (e.g., allow, configure, and/or enable) the application one or more first entitlements (e.g., one or more rights, permissions, and/or abilities) with respect to the first accessory (e.g., establish a first ecosystem and/or manage the accessory), where the request to add the credential includes at least a portion of the setup information (e.g., an identifier, an address, and/or a setup code for the first accessory). In some examples, the application establishes a communication channel with the first accessory using the setup information. In some examples, the application communicates with the first accessory without going through the setup component.

In some examples, the request to add an accessory is a request to add the first accessory.

In some examples, the request to add the credential includes a setup code (e.g. as described above in relation to method 600) received from the setup component. In some examples, the setup code is a set of one or more numbers and/or one or more characters used to establish a link (e.g., a pairing) with the first accessory. In some examples, the setup information is generated by the setup component. In some examples, the setup information is generated by the first accessory.

In some examples, the request to add the accessory is sent to the setup component in response to capture of an image (e.g., an image of a pattern (e.g., a QR code or a light) corresponding to the first accessory) by a camera in communication with the computer system (e.g., a camera of the computer system), causes display of a camera user interface (e.g., a capture user interface, a user interface including a shutter button that, when selected, causes a computer system to capture (e.g., via a camera) and store an image); or causes a communication to be sent to a computer system (e.g., the first accessory or a different computer system) different from the computer system. In some examples, the communication is sent via Bluetooth, WiFi, an internet protocol communication channel, NEC, or UWB.

In some examples, the setup information includes a setup code or (e.g., and/or) an address of the first accessory. In some examples, the address is a name, an internet protocol address, a media access control address, and/or a unique identifier of the first accessory. In some examples, the setup code is a set of one or more numbers and/or one or more characters used to establish a link (e.g., a pairing) with the first accessory. In some examples, the setup information is generated by the computer system. In some examples, the setup information is received from the first accessory.

In some examples, the request to add the credential is sent to the first accessory via the setup component.

In some examples, after sending the request to add the credential to the first accessory, the application sends, to the first accessory using the credential (e.g., a message sent to the accessory can include the credential and/or an indication of the credential), a command to change a state (e.g., on or off or an amount or value of a setting) of the accessory (e.g., as described above in relation to method 600).

In some examples, the command is sent to the first accessory via the setup component (e.g., when the setup component is acting as a bridge for the application).

Note that details of the processes described above with respect to method 700 (e.g., FIG. 7) are also applicable in an analogous manner to the methods described above and below. For example, method 600 optionally includes one or more of the characteristics of the various methods described above with reference to method 700. For example, the application of FIG. 6 can be the application of FIG. 7. For brevity, these details are not repeated below.

FIG. 8 is a flow diagram illustrating a method for initial setup of an accessory from the perspective of the accessory in accordance with some embodiments. Method 600 is performed at an accessory (e.g., 340, 350, 406). In some examples, the accessory is an air conditioner, an air purifier, a bridge, a camera, a doorbell, a fan, a faucet, a garage door, a humidifier, a light, a lock, an outlet, a receiver, a router, a security system, a sensor, a speaker, a sprinkler, a switch, a thermostat, a television, an actuator, and/or a window.

At 810, the accessory receives, from a setup component (e.g., an operating-system component or an application different from an operating system) of a computer system, a first credential (e.g., an accessory management credential, such as a certificate and/or identifier corresponding to the setup component) to grant the setup component one or more first entitlements (e.g., one or more rights, permissions, and/or abilities) with respect to the accessory (e.g., establish a first ecosystem and/or manage the accessory). In some examples, the computer system is a watch, a phone, a tablet, a processor, a head-mounted display (HMI) device, and/or a personal computing device. In some examples, the first ecosystem is a grouping of one or more accessories and one or more controllers (e.g., a device, a computer system, an application executing on a device, and/or a software process configured to control an accessory).

After receiving the first credential, at 820, the accessory receives, from the setup component, a request to add a second credential to grant one or more second entitlements (e.g., the one or more second entitlements are the same as the one or more first entitlements or are different from the one or more first entitlements (e.g., at least one different entitlement of the one or more first entitlements)) with respect to the accessory (e.g., add a controller, a second ecosystem different from the first ecosystem, a credential to control the accessory, and/or an administrator different from the setup component), where the second credential is different from the first credential. In some examples, the second ecosystem is a grouping of one or more accessories and one or more controllers (e.g., a device, a computer system, an application executing on a device, and/or a software process configured to control an accessory).

After receiving the request to add the second credential from the setup component, at 830, the accessory receives, from an application of the computer system, a request to add the second credential (e.g., a certificate and/or identifier corresponding to the application) to grant (e.g., allow, configure, and/or enable) the application the one or more second entitlements (e.g., one or more rights, permissions, and/or abilities) with respect to the accessory (e.g., establish a first ecosystem and/or manage the accessory), where the application is different from the setup component. In some examples, the accessory grants, to the setup component based on the first credential, the one or more first entitlements with respect to the accessory. In some examples, the accessory grants, to the application based on the second credential, the one or more second entitlements with respect to the accessory. In some examples, the application is an application of an ecosystem that allows for a user to control one or more accessories (including, for example, accessories of different types and/or from different manufacturers), an application of an accessory manufacturer that allows for a user to control one or more accessories associated with the accessory manufacturer, and/or an application for a particular communication protocol (e.g., the application communicates according to the particular communication protocol to accessories that are configured for the particular communication protocol). In some examples, the first ecosystem is a grouping of one or more accessories and one or more controllers (e.g., a device, a computer system, an application executing on a device, and/or a software process configured to control an accessory).

In some examples, before receiving the first credential, the accessory sends, to the computer system (e.g., to the setup component and/or the application of the computer system) (e.g., via Bluetooth, WiFi, an internet protocol communication channel, NFC, UWB, and/or light), setup information. In some examples, the first credential is based on the setup information (e.g., the first credential includes at least a portion of the setup information and/or an indication of at least a portion of the setup information).

In some examples, the setup information includes at least one of a setup code (e.g., as described above in relation to method 600) and an address of the first accessory. In some examples, the address is a name, an internet protocol address, a media access control address, and/or a unique identifier of the first accessory. In some examples, the setup code is a set of one or more numbers and/or one or more characters used to establish a link (e.g., a pairing) with the first accessory.

In some examples, the first credential is received in a message formatted according to a first communication protocol (e.g., as described above in relation to method 600). In some examples, the request to add the second credential is received from the application in a message formatted according to a second communication protocol (e.g., as described above in relation to method 600) different from the first communication protocol.

In some examples, the request to add the second credential is received from the setup component in a message formatted according to a third communication protocol (e.g., as described above in relation to method 600). In some examples, the request to add the second credential is received from the application in a message formatted according to a fourth communication protocol (e.g., as described above in relation to method 600) different from the third communication protocol.

In some examples, the request to add the second credential that is received from the setup component includes a setup code (e.g., as described above in relation to method 600). In some examples, the request to add the second credential that is received from the application includes the setup code. In some examples, the setup code is a set of one or more numbers and/or one or more characters used to establish a link (e.g., a pairing) with the accessory.

In some examples, the accessory receives, from the application, a command to change a state (e.g., on or off or an amount or value of a setting) (e.g., as described above in relation to method 600) of the accessory.

In some examples, the accessory receives, from the setup component, a command to change a state (e.g., on or off or an amount or value of a setting) (e.g., as described above in relation to method 600) of the accessory (e.g., when the setup component is acting as a bridge from the application).

Note that details of the processes described above with respect to method 800 (e.g., FIG. 8) are also applicable in an analogous manner to the methods described above. For example, method 600 optionally includes one or more of the characteristics of the various methods described above with reference to method 800. For example, the accessory of FIG. 6 can be the accessory of FIG. 8. For brevity, these details are not repeated below.

The foregoing description, for purpose of explanation, has been described with reference to specific examples. However, the illustrative discussions above are not intended to be exhaustive or to limit the disclosure to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve how a device interacts with a user. The present disclosure contemplates that in some instances, this gathered data can include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to change how a device interacts with a user. Accordingly, use of such personal information data enables better user interactions. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of image capture, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be displayed to users by inferring location based on non-personal information data or a bare minimum amount of personal information, such as the content being requested by the device associated with a user or other non-personal information.

What is claimed is:

1. A method, comprising:

at a setup component of a computer system:

receiving an indication of an accessory, wherein the accessory is different from the computer system;

in response to receiving the indication, sending, to the accessory, a first credential to grant the setup component one or more first entitlements with respect to the accessory; and after sending the first credential:

sending, to the accessory using the first credential, a request to add a second credential to grant one or more second entitlements with respect to the accessory, wherein the second credential is different from the first credential;

sending, to a first application of the computer system, first setup information for the accessory, wherein the first setup information is intended to be used by the first application to communicate with the accessory to grant the first application the one or more second entitlements with respect to the accessory, and wherein the first application is different from the setup component;

sending, to the accessory using the first credential, a request to add a third credential to grant one or more third entitlements with respect to the accessory, wherein the third credential is different from the first credential and the second credential; and sending, to a second application of the computer system, second setup information for the accessory, wherein the second setup information is intended to be used by the second application to communicate with the accessory to grant the second application the one or more third entitlements with respect to the accessory, wherein the first application is different from the setup component and the second application.

2. The method of claim 1, wherein the one or more second entitlements correspond to a first ecosystem and not a second ecosystem, wherein the indication of the accessory is received within a request to add the accessory to the second ecosystem, and wherein the one or more third entitlements correspond to the second ecosystem and not the first ecosystem.

3. The method of claim 2, wherein the indication of the accessory is:

determined from an image captured by a camera in communication with the computer system; or received, via a communication channel, from a device different from the computer system.

4. The method of claim 2, wherein the request is received from the first application.

5. The method of claim 1, wherein the setup information includes a setup code or an address of the accessory.

6. The method of claim 1, further comprising:

selecting a first communication protocol from a plurality of communication protocols supported by the accessory, wherein the setup information is sent to the accessory in a message according to the first communication protocol, and wherein the one or more second entitlements correspond to a second communication protocol of the plurality of communication protocols, and wherein the second communication protocol is different from the first communication protocol.

7. The method of claim 1, further comprising:

after sending, to the first application of the computer system, the first setup information for the accessory, receiving, from the first application, a command to change a state of the accessory;

generating, according to a particular communication protocol, a message corresponding to the command; and sending, to the accessory, the message.

8. The method of claim 1, wherein the first credential is sent to the accessory in a request to add the first credential to grant the one or more first entitlements with respect to the accessory.

9. A non-transitory computer-readable storage medium storing one or more programs configured to be executed by one or more processors of a computer system, the one or more programs including instructions of a setup component for:

receiving an indication of an accessory, wherein the accessory is different from the computer system;

in response to receiving the indication, sending, to the accessory, a first credential to grant the setup component one or more first entitlements with respect to the accessory; and after sending the first credential:

sending, to the accessory using the first credential, a request to add a second credential to grant one or more second entitlements with respect to the accessory, wherein the second credential is different from the first credential;

sending, to a first application of the computer system, first setup information for the accessory, wherein the first setup information is intended to be used by the first application to communicate with the accessory to grant the first application the one or more second entitlements with respect to the accessory, and wherein the first application is different from the setup component;

sending, to the accessory using the first credential, a request to add a third credential to grant one or more third entitlements with respect to the accessory, wherein the third credential is different from the first credential and the second credential; and sending, to a second application of the computer system, second setup information for the accessory, wherein the second setup information is intended to be used by the second application to communicate with the accessory to grant the second application the one or more third entitlements with respect to the accessory, wherein the first application is different from the setup component and the second application.

10. The non-transitory computer-readable storage medium of claim 9, wherein the one or more second entitlements correspond to a first ecosystem and not a second ecosystem, wherein the indication of the accessory is received within a request to add the accessory to the second ecosystem, and wherein the one or more third entitlements correspond to the second ecosystem and not the first ecosystem.

11. The non-transitory computer-readable storage medium of claim 9, wherein the indication of the accessory is:

determined from an image captured by a camera in communication with the computer system; or received, via a communication channel, from a device different from the computer system.

12. The non-transitory computer-readable storage medium of claim 9, wherein the request is received from the first application.

13. The non-transitory computer-readable storage medium of claim 9, wherein the setup information includes a setup code or an address of the accessory.

14. The non-transitory computer-readable storage medium of claim 9, the one or more programs including instructions of the setup component for:

selecting a first communication protocol from a plurality of communication protocols supported by the accessory, wherein the setup information is sent to the accessory in a message according to the first communication protocol, and wherein the one or more second entitlements correspond to a second communication protocol of the plurality of communication protocols, and wherein the second communication protocol is different from the first communication protocol.

15. The non-transitory computer-readable storage medium of claim 9, the one or more programs including instructions of the setup component for:

after sending, to the first application of the computer system, the first setup information for the accessory, receiving, from the first application, a command to change a state of the accessory;

generating, according to a particular communication protocol, a message corresponding to the command; and sending, to the accessory, the message.

16. The non-transitory computer-readable storage medium of claim 9, wherein the first credential is sent to the accessory in a request to add the first credential to grant the one or more first entitlements with respect to the accessory.

17. A computer system, comprising:

one or more processors; and memory storing one or more programs configured to be executed by the one or more processors, the one or more programs including instructions of a setup component for:

receiving an indication of an accessory, wherein the accessory is different from the computer system;

in response to receiving the indication, sending, to the accessory, a first credential to grant the setup component one or more first entitlements with respect to the accessory; and after sending the first credential:

sending, to the accessory using the first credential, a request to add a second credential to grant one or more second entitlements with respect to the accessory, wherein the second credential is different from the first credential;

sending, to a first application of the computer system, first setup information for the accessory, wherein the first setup information is intended to be used by the first application to communicate with the accessory to grant the first application the one or more second entitlements with respect to the accessory, and wherein the first application is different from the setup component;

sending, to the accessory using the first credential, a request to add a third credential to grant one or more third entitlements with respect to the accessory, wherein the third credential is different from the first credential and the second credential; and sending, to a second application of the computer system, second setup information for the accessory, wherein the second setup information is intended to be used by the second application to communicate with the accessory to grant the second application the one or more third entitlements with respect to the accessory, wherein the first application is different from the setup component and the second application.

18. The computer system of claim 17, wherein the one or more second entitlements correspond to a first ecosystem and not a second ecosystem, wherein the indication of the accessory is received within a request to add the accessory to the second ecosystem, and wherein the one or more third entitlements correspond to the second ecosystem and not the first ecosystem.

19. The computer system of claim 17, wherein the indication of the accessory is:

determined from an image captured by a camera in communication with the computer system; or received, via a communication channel, from a device different from the computer system.

20. The computer system of claim 17, wherein the request is received from the first application.

21. The computer system of claim 17, wherein the setup information includes a setup code or an address of the accessory.

22. The computer system of claim 17, the one or more programs including instructions of the setup component for:

selecting a first communication protocol from a plurality of communication protocols supported by the accessory, wherein the setup information is sent to the accessory in a message according to the first communication protocol, and wherein the one or more second entitlements correspond to a second communication protocol of the plurality of communication protocols, and wherein the second communication protocol is different from the first communication protocol.

23. The computer system of claim 17, the one or more programs including instructions of the setup component for:

receiving, from the first application, a command to change a state of the accessory;

generating, according to a particular communication protocol, a message corresponding to the command; and sending, to the accessory, the message.

24. The computer system of claim 17, wherein the first credential is sent to the accessory in a request to add the first credential to grant the one or more first entitlements with respect to the accessory.

* * * * *